(12) United States Patent
Jackson et al.

(10) Patent No.: US 10,814,649 B2
(45) Date of Patent: Oct. 27, 2020

(54) CONTROL OF PARTICLE LAYER DEPTH AND THICKNESS DURING POWDER PRINTING

(71) Applicant: Palo Alto Research Center Incorporated, Palo Alto, CA (US)

(72) Inventors: Warren B. Jackson, San Francisco, CA (US); Kent A. Evans, Sunnyvale, CA (US); Sean E. Doris, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/210,656

(22) Filed: Dec. 5, 2018

(65) Prior Publication Data
US 2020/0180328 A1 Jun. 11, 2020

(51) Int. Cl.
| | |
|---|---|
| B41J 11/00 | (2006.01) |
| C09D 11/30 | (2014.01) |
| B41M 7/00 | (2006.01) |
| B41M 7/02 | (2006.01) |
| B41J 2/21 | (2006.01) |
| C09D 11/54 | (2014.01) |

(52) U.S. Cl.
CPC ............ B41J 11/002 (2013.01); B41J 2/2117 (2013.01); C09D 11/30 (2013.01); C09D 11/54 (2013.01)

(58) Field of Classification Search
CPC .... B41J 11/002; B41M 7/0081; B41M 7/009; B41M 7/02
See application file for complete search history.

(56) References Cited

U.S. PATENT DOCUMENTS
| | | |
|---|---|---|
| 3,258,817 A | 7/1966 | Smiley |
| 5,387,380 A | 2/1995 | Cima et al. |
| 6,155,666 A | 12/2000 | Sugimoto et al. |
| 6,502,912 B1 | 1/2003 | Bernard et al. |
| 6,746,114 B2 | 6/2004 | Takahashi et al. |
| 2004/0101619 A1 | 5/2004 | Camorani |
| 2007/0076069 A1 | 4/2007 | Edwards et al. |

(Continued)

FOREIGN PATENT DOCUMENTS
EP 3144358 A1 3/2017

OTHER PUBLICATIONS
Jackson et al., U.S. Appl. No. 15/850,034, filed Dec. 21, 2017.
(Continued)

*Primary Examiner* — Kristal Feggins
*Assistant Examiner* — Kendrick X Liu
(74) *Attorney, Agent, or Firm* — Meuting Raasch Group

(57) ABSTRACT

A printing system includes a liquid ejector configured to deposit a curable layer on a surface of a substrate, the layer having a free surface and an interface between the layer and the substrate. A pre-curing device pre-cures the layer such that a first region closer to the free surface is less cured than a second region closer to the interface. The curing device includes a pre-curing initiator source configured to provide a pre-curing initiator that polymerizes the layer. The curing device also includes a pre-curing inhibitor source configured to deliver an inhibitor that inhibits polymerization of the layer. A particle delivery device delivers particles to the layer after the layer is pre-cured.

20 Claims, 25 Drawing Sheets

(56) References Cited

U.S. PATENT DOCUMENTS

| | | | | |
|---|---|---|---|---|
| 2012/0269983 | A1* | 10/2012 | Grinberg | B41M 3/006 427/470 |
| 2015/0279246 | A1* | 10/2015 | Bartholomew | C09J 7/30 283/81 |
| 2015/0376470 | A1* | 12/2015 | Masuko | C08F 2/48 428/345 |
| 2019/0322881 | A1* | 10/2019 | Chopra | C09D 11/103 |

OTHER PUBLICATIONS

Pan et al., "The Investigation of Gravity-Driven Metal Powder Flow in Coaxial Nozzle for Laser-Aided Direct Metal Deposition Process", Journal of Manufacturing Science and Engineering, vol. 128, May 2006, pp. 541-553.

* cited by examiner

CONTROL OF PARTICLE LAYER DEPTH AND THICKNESS DURING POWDER PRINTING

BACKGROUND

Inkjet printing systems may use particles in a liquid ink to give the ink various properties. Particles may be added to the liquid ink to change properties of the liquid such as color, surface texture, opacity, luminescence, and/or other properties.

SUMMARY

Embodiments described herein involve a printing system comprising a liquid ejector configured to deposit a curable layer on a surface of a substrate, the layer having a free surface and an interface between the layer and the substrate. A pre-curing device pre-cures the layer such that a first region closer to the free surface is less cured than a second region closer to the interface. The pre-curing device includes a pre-curing initiator source configured to generate a pre-curing initiator that polymerizes the layer. The pre-curing device also includes a pre-curing inhibitor source configured to deliver an inhibitor that inhibits polymerization of the layer. A particle delivery device delivers particles to the layer after the layer is pre-cured.

Some embodiments are directed to a printing method. A curable layer is deposited on a surface of a substrate. The layer has a free surface and an interface between the layer and the substrate. The layer is pre-cured such that a first region closer to the interface of the layer is more cured than a second region closer to the free surface of the layer. Particles are delivered to the free surface of the layer after layer is pre-cured.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
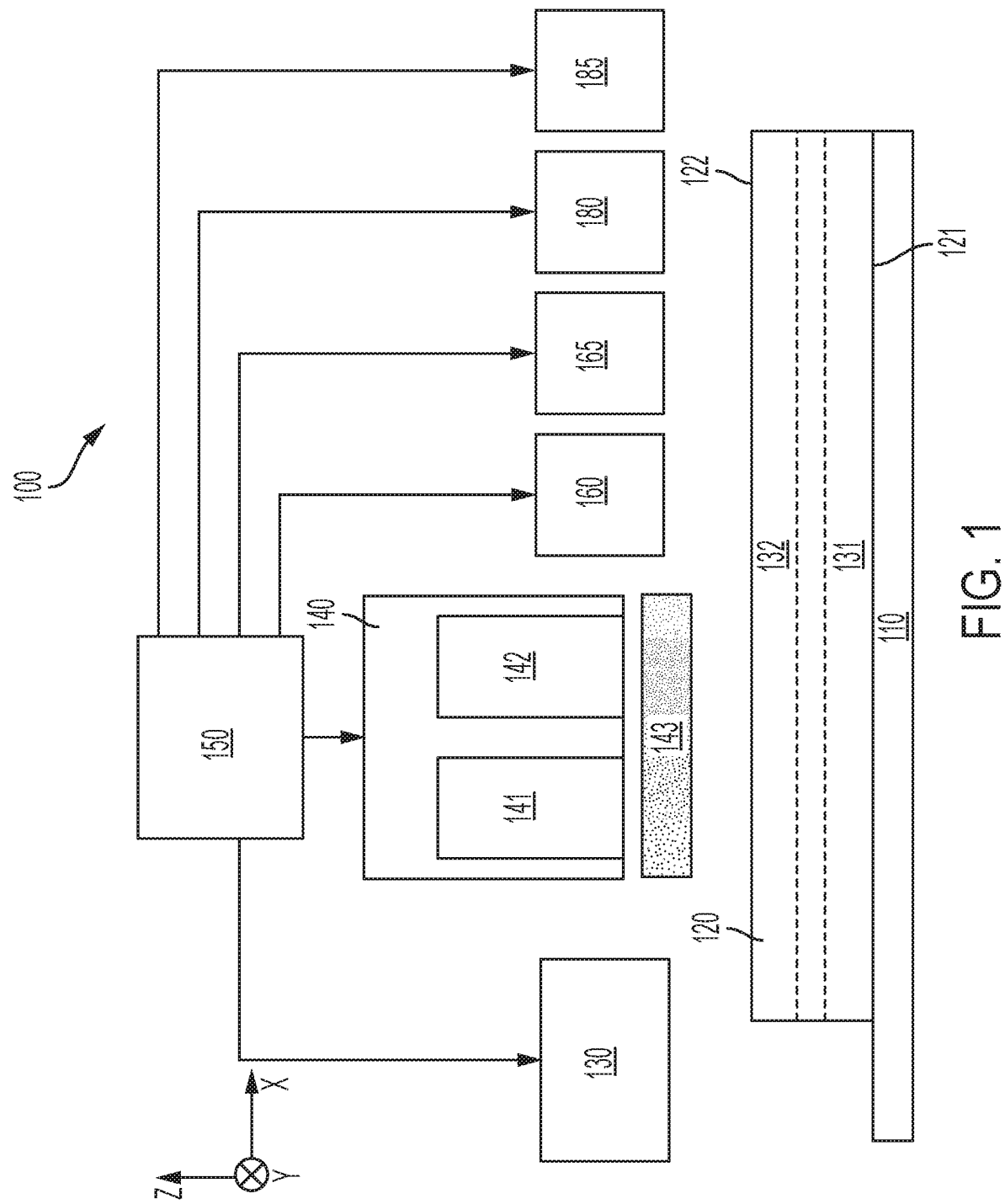
FIG. 1 is a block diagram of a printing system 100 for forming an article that includes a particle-loaded ink layer in accordance with some embodiments.

Inkjet printing systems may use solid materials in a liquid ink to give the ink various properties. The solid materials, e.g., particles may be configured to change at least one property of the liquid. For example, the solid materials may change the color, surface texture, opacity, luminescence, and/or other properties of the liquid. Saturated colors such as white may be more easily achieved by using a high proportion of solid materials to liquid. In some cases, chemical properties of the liquid may be controlled using powder treatments, for example.

In many implementations it is useful to control the location, concentration and/or orientation of particles during printing to control optical, chemical, mechanical and/or electrical properties of printed items. Many important properties of surfaces can be modified and controlled through the use of particles. Particles control optical properties such as saturated colors by trapping, scattering, and/or absorbing light using pigment and scattering particles. The diffuse and specular appearance of a surface can also be controlled by particles. The thickness of particle layers is a factor in the visual appearance of the layer due to the relationship between scattering and absorption. Burying the scattering layers below an absorbing layer controls the diffusive component of the light emitted from a layer. Similarly, the specular component is controlled by the depth of surface penetration of the particle layer.

Additionally, the mechanical surface roughness can be modified by either have particles penetrating the top surface or located in layers below the surface. Furthermore, chemical and/or electrical properties can be controlled by chemically sensitive particles located near the surface or embedded within the layer. In all these cases, it is important to control the particle depth or location from the surface, the density, the size, the orientation, and the particle layer thickness.

Embodiments described herein are directed to methods and systems for forming articles by jetting patterns of liquid ink onto a substrate followed by applying particles to the surface of the ink layer. A variety of useful optical, chemical, and mechanical properties of the articles can be controlled by controlling a density, depth, thickness, pattern, and/or concentration of the particles in the bulk of the ink layer. Additional description of systems and methods involving the application of both liquid ink and particles that are applicable to the approaches presented herein are provided in commonly owned U.S. patent application Ser. No. 15/850,034 filed on Dec. 21, 2017 which is incorporated herein by reference.

The position, concentration, alignment, and other properties of the particles present in the bulk and/or at the surface of the layer can be adjusted by controlling the pre-curing, particle deposition, and/or curing parameters. For example, pre-curing, particle deposition, and/or curing parameters may be selected to control the depth of the particles in the layer, the thickness of a band of particles in the layer, the concentration of particles in the layer, the gradient of particle concentration, surface concentration of particles, particle alignment, among other properties. Surface properties of the article can be adjusted by controlling alignment and/or concentration of the particles at the surface of the layer. In some configurations, one or more additional layers can be deposited over the particle-loaded ink layer.

FIG. 1 is a block diagram of a printing system 100 for forming an article that includes a particle-loaded ink layer in accordance with some embodiments. The system 100 includes a liquid ejector 130 configured to deposit a curable layer 120 on a surface of a substrate 110. A wide variety of media may be employed for the substrate 110 such as paper, plastic, foil, fabric, composite sheet film, ceramic, fabrics, and glass, for example.

In some embodiment, the liquid ejector 130 comprises one or more ink jets. Each ink jet includes a reservoir that holds the liquid which passes through an orifice into an ejection chamber cavity. An actuator, such as a piezoelectric transducer (PZT) actuator, can be activated to induce a pressure wave within the ejection chamber cavity sufficient to cause ejection of an ink drop through the ejector nozzle. The liquid ejector 130 may be activated by a signal from a controller 150.

The deposited liquid layer 120 has a free surface 122 and an interface surface 121 at an interface between the layer 120 and the substrate 110. A pre-curing device 140 pre-cures the layer 120 such that a first region 131 closer to the interface layer 121 is more cured than a second region 132 closer to the free surface 122. The pre-curing device 140 includes a pre-curing initiator source 141 configured to provide a pre-curing initiator, such as UV radiation or a gas, that initiates polymerizes the layer 120. The pre-curing device also includes a pre-curing inhibitor source 142 that provides a pre-curing inhibitor which inhibits polymerization of the layer 120. The controller 150 can be configured to control the pre-curing device 140 including both the operation of the pre-curing initiator source 141 and the pre-curing inhibitor source 142. For example, the controller may control the pre-curing device 140 to obtain a region 131 that is more cured which is a predetermined depth from the free surface 122 of the of the layer 120.

In some implementations, the pre-curing initiator source 141 comprises an ultraviolet (UV) radiation source configured to irradiation the layer with UV radiation. In some implementations the pre-curing initiator source 141 comprises a heat source that heats the layer to pre-cure the layer or an e-beam source, for example.

The pre-curing inhibitor source 142 may comprise a gas source configured to supply a pre-curing inhibitor, such as $O_2$ gas, to the layer 120. Optionally the system 100 includes a patterning device 143 that interacts with one or both of the pre-curing initiator provided by the pre-curing initiator source 141 and a pre-curing inhibitor provided by the pre-curing inhibitor source 142 to form a pattern of regions that are relatively more cured and less cured, the pattern extending laterally (along the y-axis) and/or longitudinally (along the x-axis) across the layer 120.

A particle delivery device 160 is configured to deliver particles to the layer 120 after the layer 120 is pre-cured. The particle delivery device 160 may comprise a body formed in a Laval-type expansion pipe. A carrier such as air, $CO_2$, etc. is injected into the body to form a propellant stream within pipe. One or more channels deliver the particles into the propellant stream which are then ejected toward the surface 122 at high velocity.

In some embodiments, the system 100 may optionally include a post-particle delivery processing device 165. In some embodiments, the post-particle deposition processing may include depositing an additional layer on the free surface before the layer is cured. As another example, the post-particle delivery processing device 165 may include a heater or a heated roller that heats the surface of the layer to change the surface characteristics of the layer after the particles have been delivered and before the layer is finally cured. The heater or heated roller can be operated to align the particles at the surface and/or to depress the particles deeper into the bulk of the layer and away from the surface to smooth the surface. The post-particle delivery processing device 165 may perform various other processes to change the bulk and/or surface properties of the layer 120.

The system 100 includes a curing device 180 configured to cure the layer 120 after the particles are delivered and post-particle delivery processing has been performed. In many implementations, curing may be performed in the absence of curing inhibitors. For example, the curing device 180 may comprise a UV radiation source configured to deliver intense UV radiation, a heat source, or an e-beam source. Optionally, the system may include a post-cure processing device 185. For example, the post-cure processing device 185 can comprise a deposition device that deposits one or more additional layers on the layer or a device that provides surface treatment to the cured layer.

Embodiments may include a controller 150 coupled to one or more of the system components 130, 140, 143, 160, 180, 185 to control operation of the system components for processing the article. Some embodiments include a movement mechanism that may be operated by the controller 150 to move the substrate 110 into position for processing relative to the system components 130, 140, 143, 160, 180, 185 as the article is being formed.

According to some embodiments, the pre-curing initiator source 141 may comprise a source of a curing gas and the pre-curing inhibitor source comprises a source of a curing inhibitor gas. The curing gas may be a gas which penetrates more deeply (along the z-axis) into the layer 120 and the curing inhibitor gas penetrates into the layer 120 less deeply than the curing gas. The controller 150 may be configured to control the relative concentrations of the curing gas and the curing inhibitor gas to achieve regions 132 in the layer 120 that are less cured and regions 131 in the layer 120 that are more cured.

Figure 2:
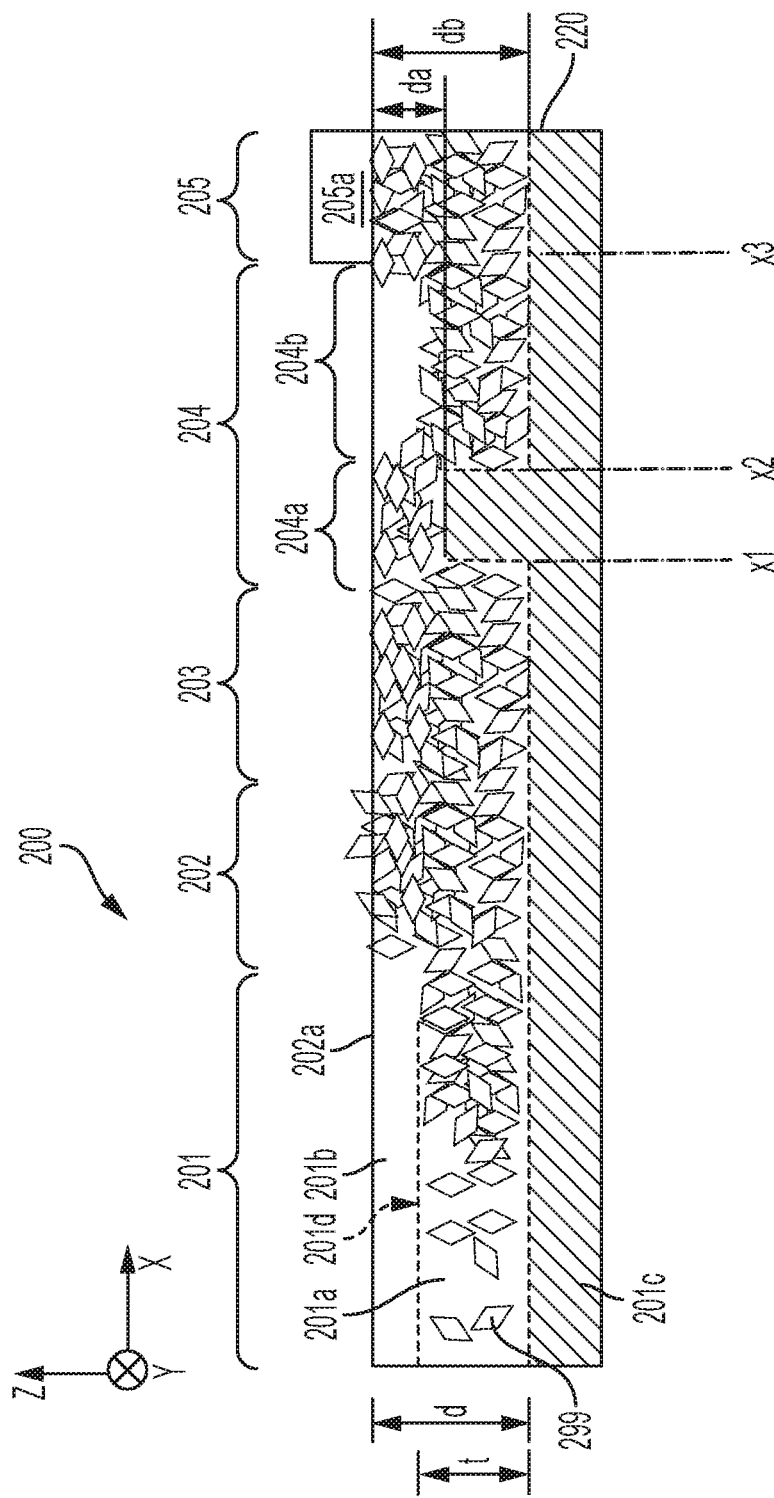
FIG. 2 is an article that can be fabricated using system shown in FIG. 1.

FIG. 2 is an article 200 that can be fabricated using system 100 shown in FIG. 1. The article 200 shown in FIG. 2 has a number of sections 201-205 that illustrate different bulk and/or surface characteristics which can be obtained in accordance with the approaches discussed herein. Article 200 is illustrated with reference to an x, y, z coordinate system in which the x axis is also referred to as the longitudinal axis, the y axis is also referred to as the lateral axis, and the z axis is also referred to as the depth axis.

For example, section 201 of the article 200 includes a band 201*a* of particles 299 having a thickness, t, wherein a region above 201*b* and below 201*c* the band 201*a* have a lower concentration of the particles 299 than the concentration of the particles 299 in the band 201*a*.

Section 201 also exhibits a concentration gradient 201*d* of particles along the x-axis in which the concentration of particles 299 increases with distance from left to right in FIG. 2. In section 201 and 202, the particles 299 extend along the depth axis (z-axis in FIG. 2) to depth, d. In section 202, at least portions of some particles 299 extend above the surface 202*a* of the layer 250.

In section 203, elongated particles 299 at the surface 202*a* of the layer 220 are aligned with each other such that their major axes lie in the plane of the layer 220. Section 204 illustrates patterning of the layer 220 that extends along the longitudinal axis. Subsection 204*a* is disposed between longitudinal positions x1 and x2 and subsection 204*b* is disposed between longitudinal positions x2 and x3. The particles in subsection 204*a* extend to a depth $d_a$ in the layer 220 whereas particles 299 in subsection 204*b* extend to a depth $d_b$. In section 205 an additional layer 205*a* has been deposited over the free surface 202*a* of layer 220.

Figure 3A:
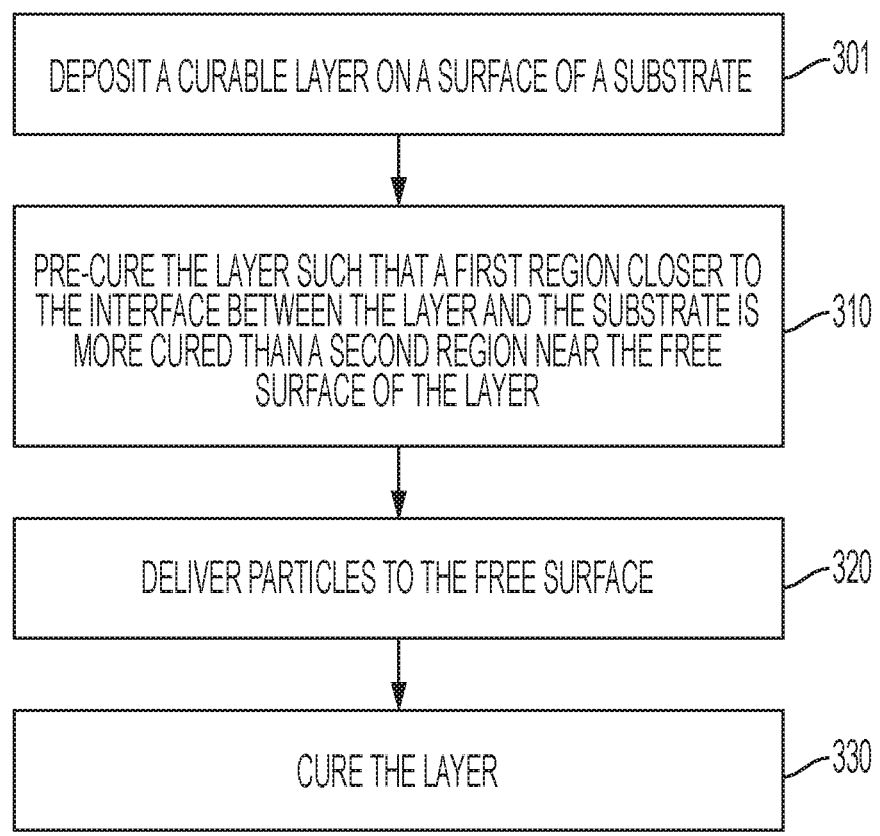
FIGS. 3A through 3H are flow diagrams illustrating methods of forming the article of FIG. 2.

FIG. 3A is a flow diagram illustrating a method of forming an article in accordance with some embodiments. A liquid curable layer is deposited 301 on a substrate. The curable layer is pre-cured 310 such that a first region closer to the free surface of the layer is less cured than a second region closer to the interface between the layer and the substrate. Particles are delivered 320 to the free surface after pre-curing the layer and the particle-laden layer is cured 330. Optionally, particles are delivered to the free surface of the curable layer before and after the pre-curing step 310. The particles delivered before the pre-curing step 310 may be the same type as the particles delivered after the pre-curing step 310 in some embodiments. Alternatively, the particles delivered before the pre-curing step 310 may be a different type of particles than the particles delivered after the pre-curing step 310. The particles delivered before the pre-curing step 310 may be distributed in the layer in various ways, e.g., may be uniformly distributed or may be disposed in a band.

Figure 3B:
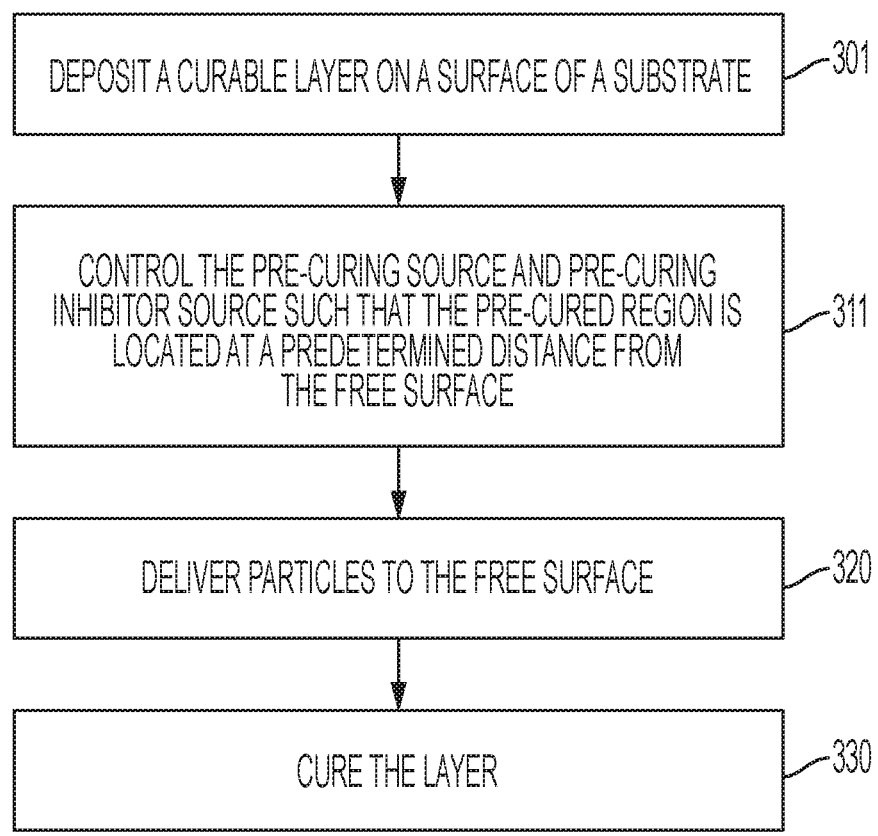

FIG. 3B is a flow diagram illustrating a method of forming an article that includes a section such as sections 201 and 202 of FIG. 2 in which the particles 299 extend to a predetermined depth in the layer. According to the method of FIG. 3B, pre-curing the layer includes controlling 311 the pre-curing initiator and/or the pre-curing inhibitor such that the pre-cured region is a located a predetermined distance from the free surface of the layer and the substrate. For example, controlling the pre-curing initiator source may involve modulating the amount of the pre-curing initiator, e.g., modulating the intensity of UV radiation or modulating the concentration of a curing gas, etc. Controlling the pre-curing inhibitor source may involve controlling concentration of the curing inhibitor, e.g., by controlling the concentration of $O_2$ in a surrounding atmosphere by flooding with $N_2$.

Figure 3C:
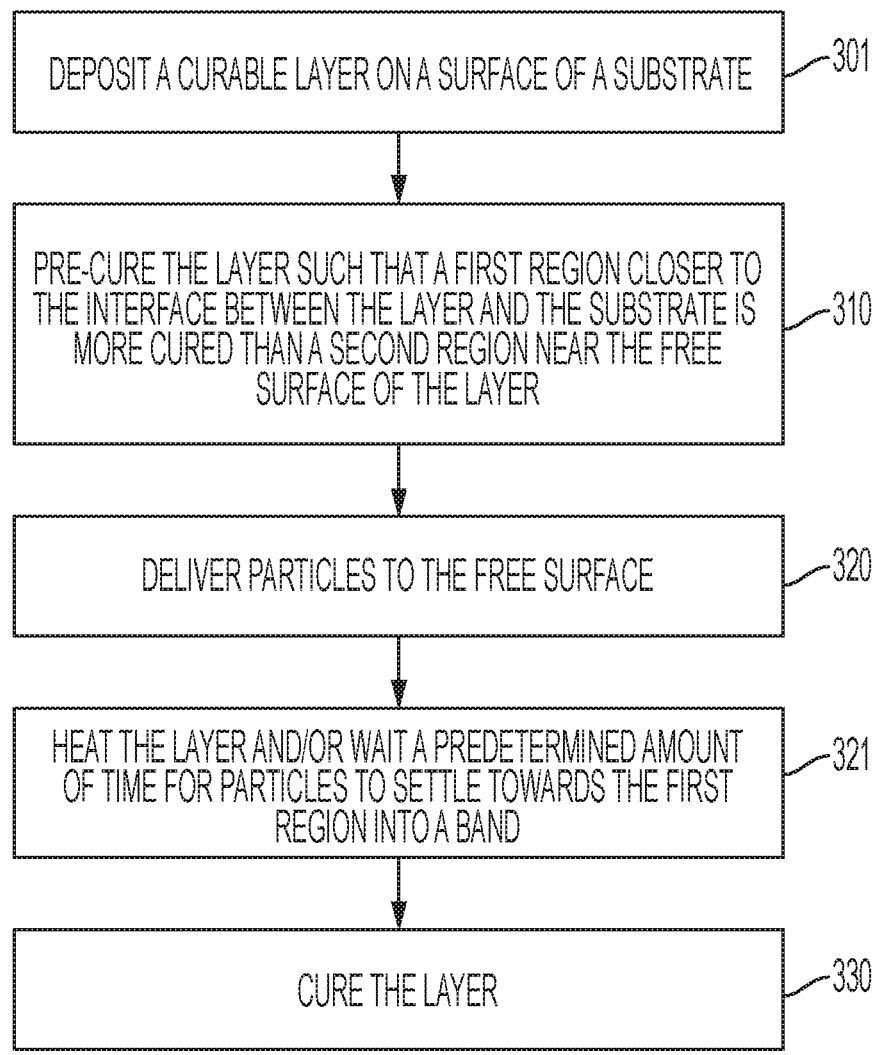

FIG. 3C is a flow diagram illustrating a method operating system 100 to form an article that includes a section such as sections 201 of FIG. 2 in which the particles 299 are disposed in a band within the layer. After the particles are delivered 320 at the free surface, the method can involve waiting 321 for a predetermined time to let the particles settle from the free surface toward the first region which is more cured. Alternatively or additionally, the pre-curing device can include a heater configured to heat the layer to reduce viscosity, allowing the particles to settle into the band as illustrated in FIG. 2.

Figure 3D:
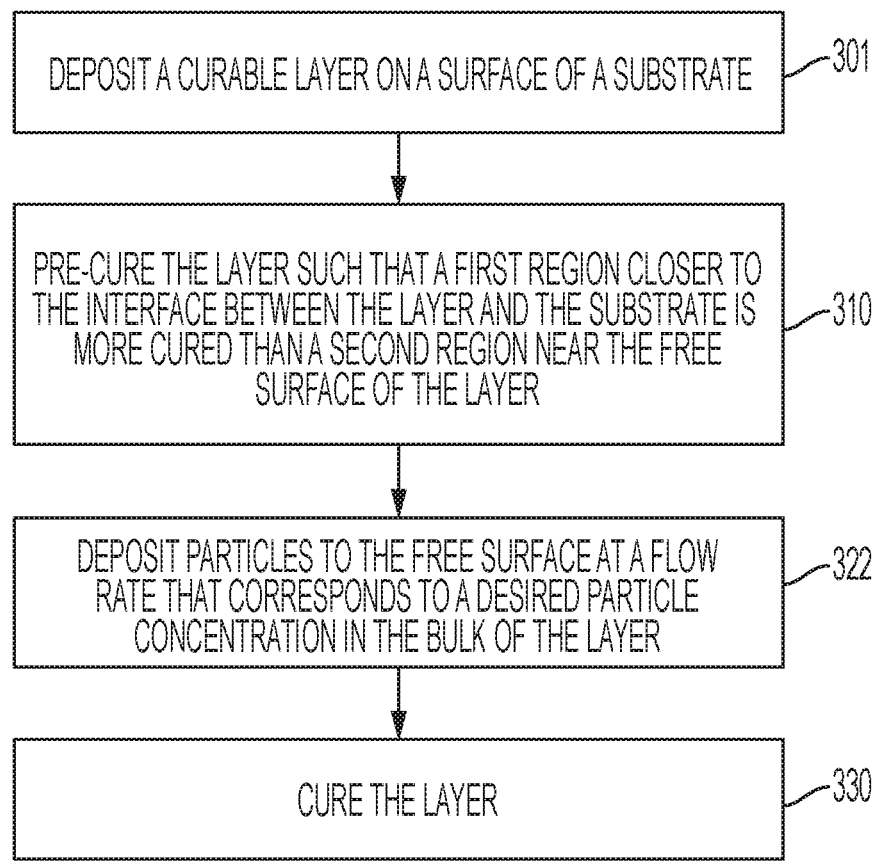

FIG. 3D is a flow diagram illustrating a method of operating system 100 to form an article that has a predetermined concentration of the particles or a particle concentration gradient in the bulk of the layer as in section 201 of FIG. 2. According to this method, delivering the particles at the free surface of the layer includes controlling 322 a deposition rate of the particles. The deposition rate can be varied, e.g., linearly, to achieve a concentration gradient of the particles as in section 201 of FIG. 2.

Figure 3E:
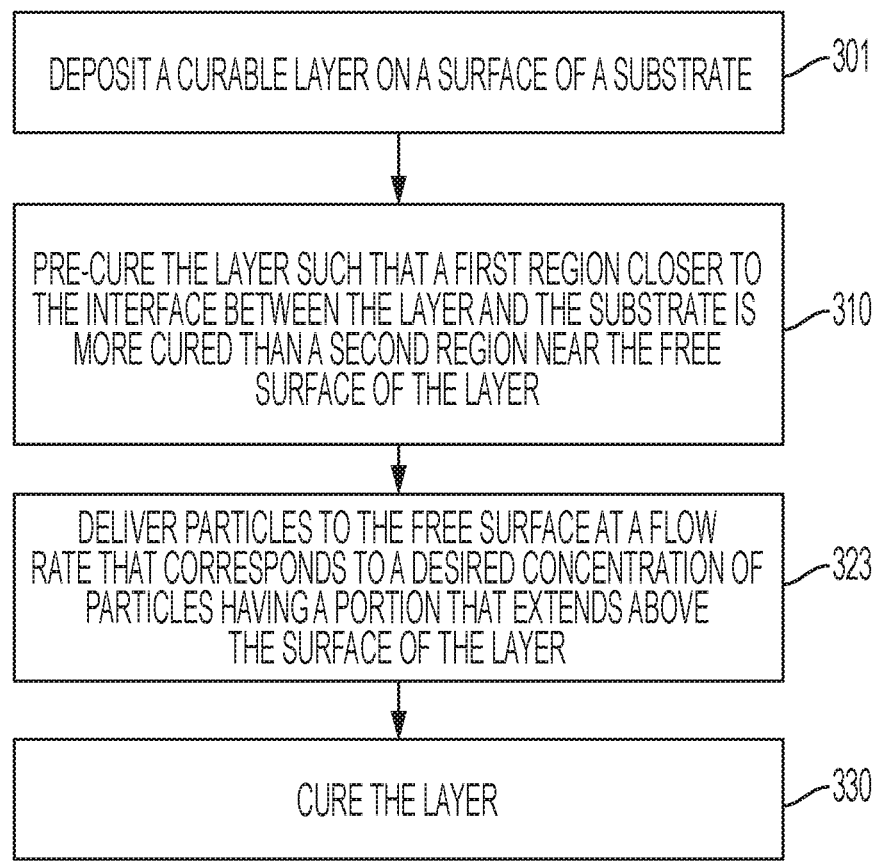

FIG. 3E is a flow diagram illustrating a method of forming an article that has a predetermined concentration of the particles or a particle concentration gradient at the surface of the layer as in section 202 of FIG. 2. According to this method, depositing the particles at the free surface of the layer includes controlling 323 a deposition rate of the particles to achieve the desired concentration of particles having at least a portion extending above the layer surface. The deposition rate of the particles can be varied to achieve a concentration gradient or pattern of the particles at the surface and/or in the bulk.

Figure 3F:
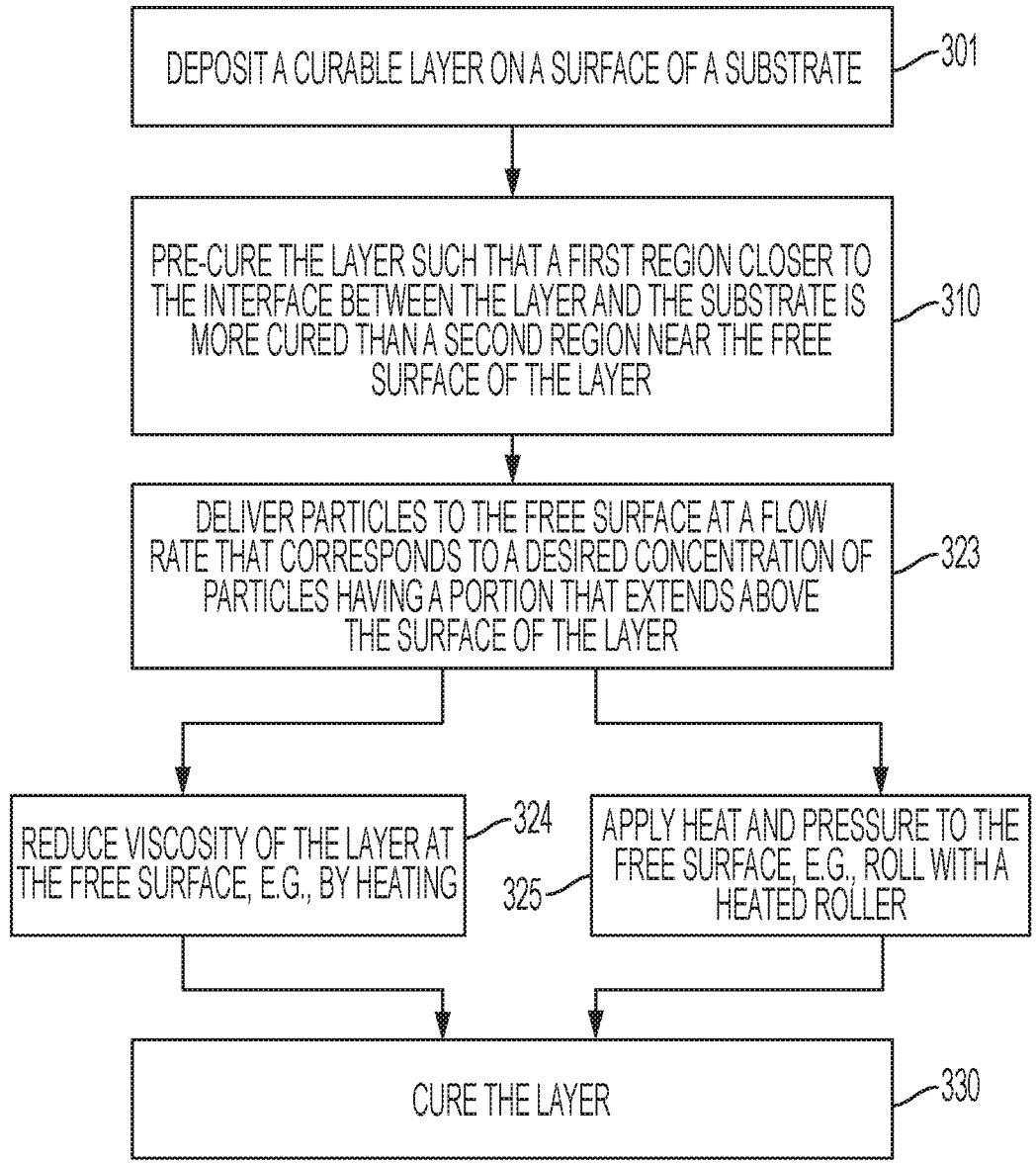

FIG. 3F is a flow diagram illustrating a method of forming an article in which particles are aligned at the surface and/or depressed into the surface of the layer as in section 203 of FIG. 2. According to this method, depositing the particles at the free surface of the layer includes controlling 323 a deposition rate of the particles to achieve the desired concentration of particles having at least a portion extending above the layer surface. After deposition of the particles, the viscosity of the layer may be reduced 324, e.g., by heating the layer. Reducing the viscosity causes the particles to sink further into the layer. When the particles are elongated as shown, reducing the viscosity can cause the particles to become more aligned near the surface. Additionally or alternatively the particles may be subjected to heat and pressure 325, e.g., by a heated roller. Applying heat and/or pressure to the surface of promote alignment and/or settling of the particles in the layer to achieve a desired surface characteristic of the layer.

Figure 3G:
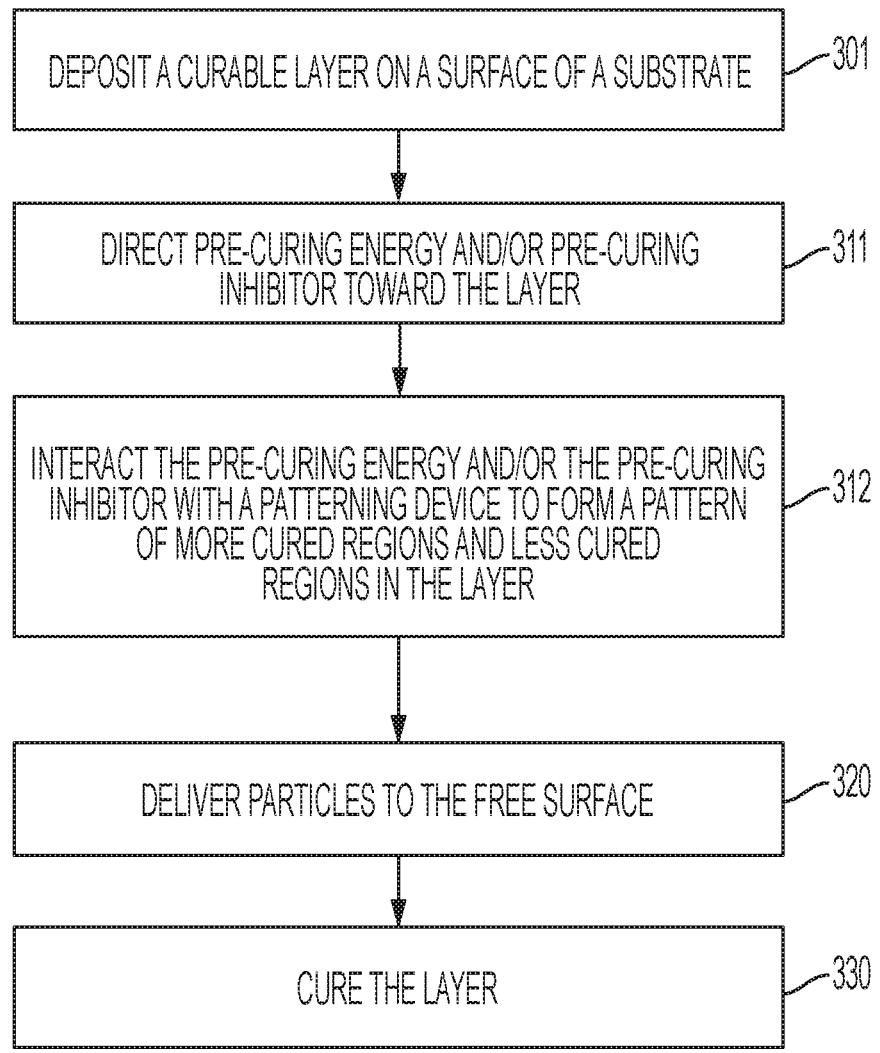

FIG. 3G is a flow diagram illustrating a method of forming an article in which the particles are laterally or longitudinally patterned in the layer as in section 204 of FIG. 2. According to this method, pre-curing the layer includes directing 311 a curing initiator and/or a curing inhibitor towards the layer. One or both of the pre-curing initiator and/or the pre-cure inhibitor interacts 312 with a patterning device to form a lateral and/or longitudinal pattern of more cured and less cured regions as illustrated by sections 204a and 204b of FIG. 2. For example, when the curing initiator is UV radiation, the pre-curing initiator patterning device may comprise a shadow mask, a movable shutter and/or other types of patterning devices such as a liquid crystal device, a digital micromirror device (DMD), a grating light valve (GLV), an acousto-optic modulator (AOM), and/or a polygon mirror raster output scanner (ROS). In some embodiments, the pre-curing initiator patterning device may comprise an array of pre-curing initiator sources and a controller configured to modulate the intensity of each of the pre-curing initiator sources to produce a spatial pattern of the curing initiator. After the pre-curing, the particles are deposited in the layer and the depth of the particles in the layer is patterned according to the pattern of the more cured regions and the less cured regions. In some embodiments, the system may include a pre-curing inhibitor patterning device configured to provide a spatial pattern of the curing inhibitor.

Figure 3H:
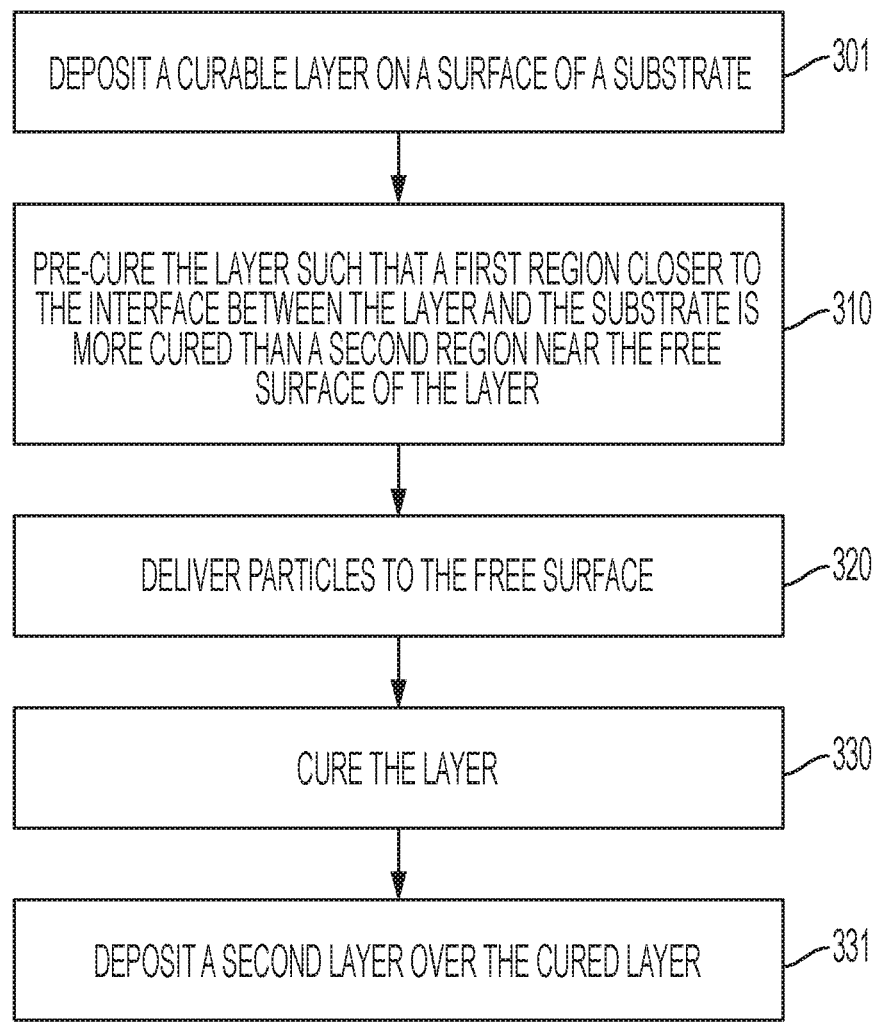

FIG. 3H is a flow diagram illustrating a method of forming an article in which one or more additional layers are formed over a surface of the layer as depicted in section 205 of FIG. 2. After the layer is cured 330, one or more layers may be deposited 331 over the surface of the layer. For example, in some embodiments, the one or more additional layers may be selected to impart certain optical characteristics to the layer, e.g., such as a light scattering layer or specular layer. For example, the patterning device may comprise a shadow mask, a movable shutter or other types of patterning devices such as a liquid crystal device, a digital micromirror device (DMD), a grating light valve (GLV), an acousto-optic modulator (AOM), and/or a raster output scanner (ROS).

Figure 4:
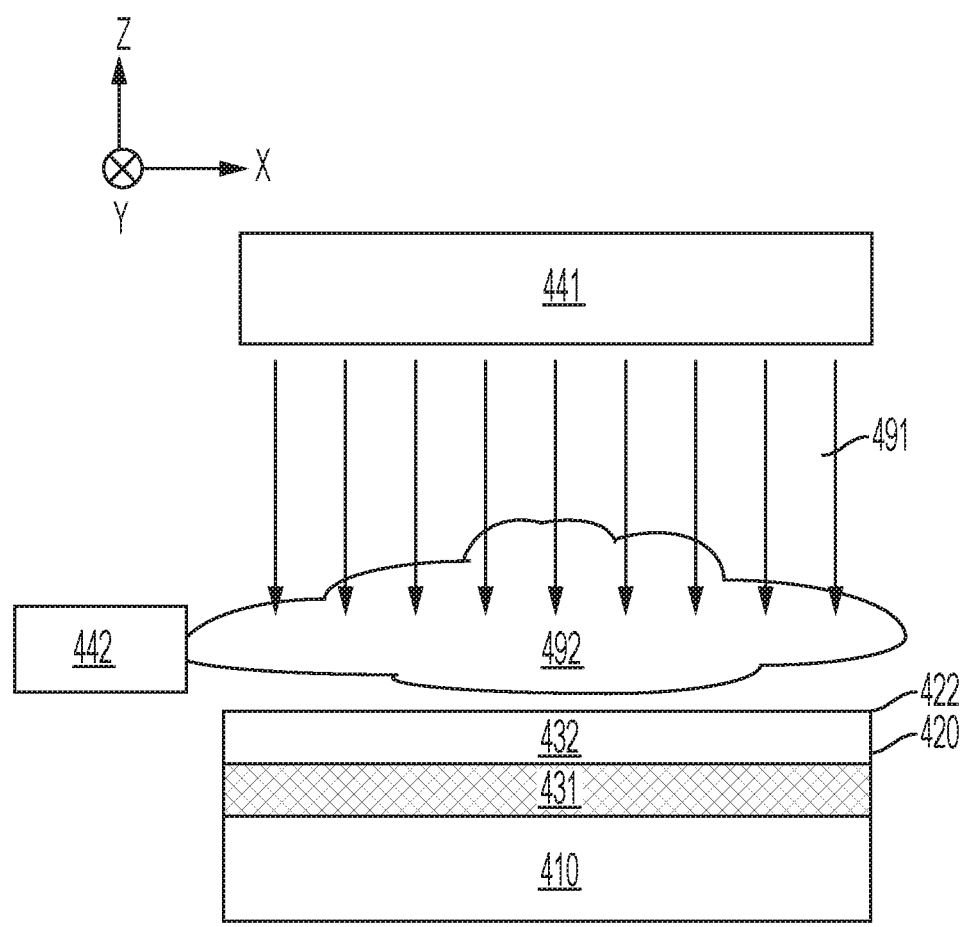
FIGS. 4 through 11 are block diagrams illustrating various optional configurations of the pre-curing device and/or particle deposition device of the system of FIG. 1.

FIGS. 4 through 11 are block diagrams illustrating various optional configurations of the pre-curing device 140 and/or particle deposition device 160 of system 100. FIG. 4 shows a pre-curing initiator source 441 located at the free surface side of the layer 420 disposed on substrate 410. The pre-curing initiator source 441 is delivering a curing initiator 491 toward the free surface 422. In many implementations, the pre-curing initiator source 421 is a UV radiation source, but other types of pre-curing initiator sources can alternatively be used such as a heat source that delivers heat energy, an electron beam source that delivers e-beam curing energy, or a gas source that delivers a curing gas to the layer 420. FIG. 4 depicts a pre-curing inhibitor source 442 positioned to deliver a curing inhibitor gas 492, such as $O_2$, toward the free surface 422. The presence of the curing inhibitor 492 at the free surface 422 inhibits curing in the region 432 near the free surface 422. Deeper in the layer 420, in region 431, the effect of the curing inhibitor 492 is decreased such that the curing initiator 491 overcomes the effect of the curing inhibitor 492 to cure region 431. The amount of the curing initiator 491 and/or the amount of the curing inhibitor 492 can be controlled by the controller (not shown in FIG. 4 but previously discussed with reference to FIG. 1) to control the relative thicknesses of the first (more cured) region 431 and the second (less cured) region 432 of the layer 420.

Figure 5:
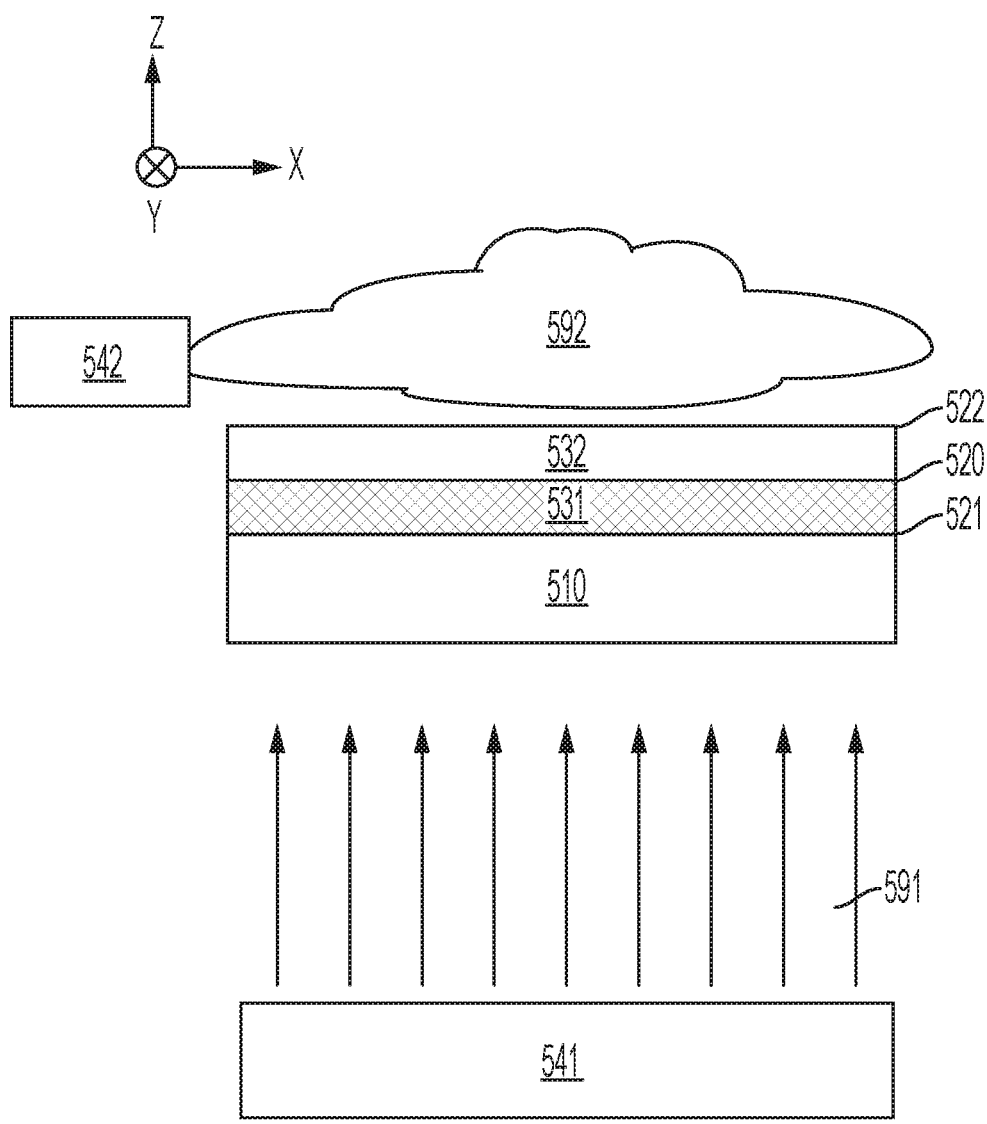

FIG. 5 illustrates a pre-curing initiator source 541 positioned proximate to the substrate 510. The substrate 510 is configured to allow the curing initiator 591 to pass through the substrate 510 with minimal or a sufficiently small amount of attenuation to allow some pre-curing to occur at the interface 521 between the substrate 510 and the layer 520. The pre-curing inhibitor source 542 is positioned to deliver a curing inhibitor gas 592 to the free surface 522. The presence of the curing inhibitor 592 at the free surface 522 inhibits curing in the region 532 near the free surface. Deeper in the layer 520, in region 531, the effect of the curing inhibitor 592 is decreased. The curing initiator 591 overcomes the effect of the curing inhibitor 592 to cure region 531. The amount of the curing initiator 591, e.g., the intensity of UV radiation, and/or the amount of the curing inhibitor 592, e.g., the concentration of curing inhibitor gas, can be controlled by the controller (not shown in FIG. 5 but previously discussed with reference to FIG. 1) to control the relative thicknesses of the more cured region 531 and the less cured region 532 of the layer 520.

In one particular embodiment, UV radiation curing energy is transmitted through a UV transparent substrate into an optically thick curable layer. The intensity of UV radiation falls off with distance along the z axis approaching the free surface 522 while the concentration of the inhibitor increases approaching the free surface 522. The use of a UV transparent substrate permits a different level of control compared with the configuration in which both the UV radiation and the inhibitor are delivered to the free surface such that both the UV and the inhibitor concentration are decreasing.

Figure 6A:
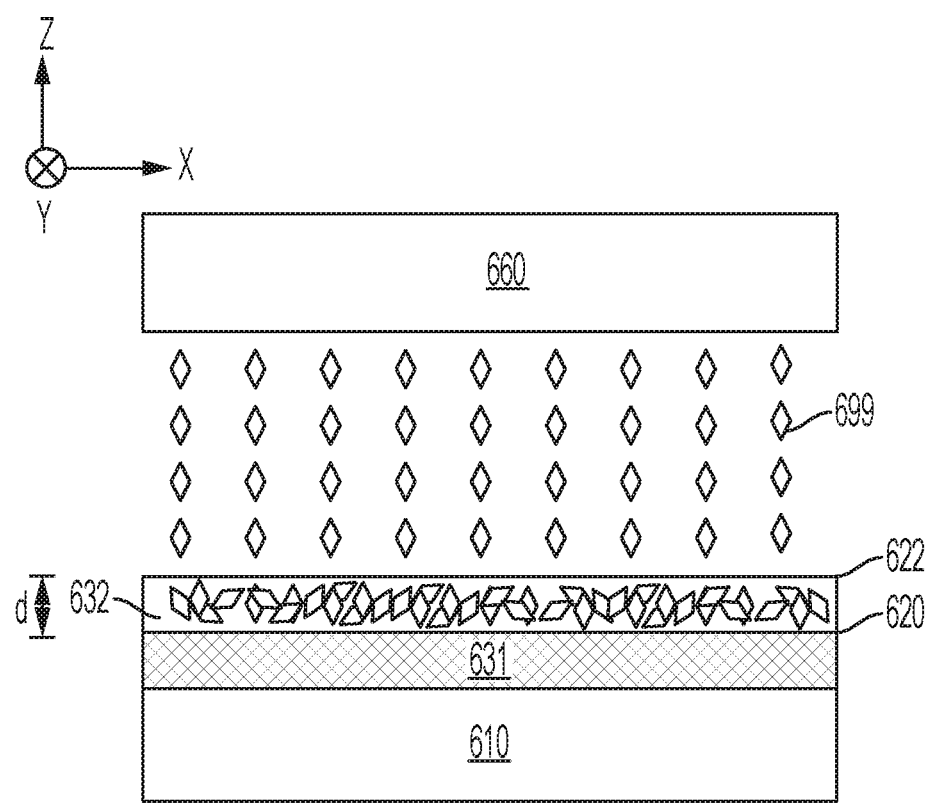
Figure 6B:
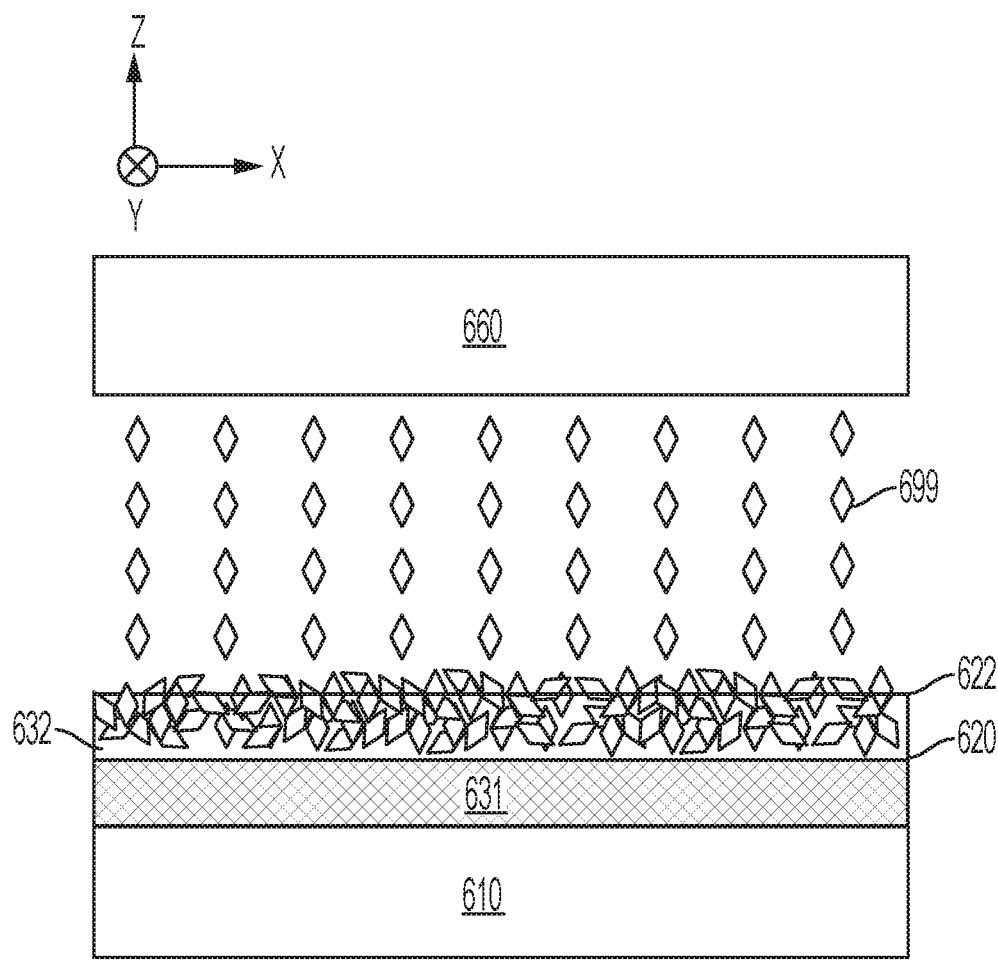

FIG. 6A illustrates the particle deposition device 660 in the process of depositing particles 699 at the free surface 622 of the layer 620 disposed on substrate 610 after the layer 620 has been pre-cured as discussed in connection with FIG. 4 or 5. The second (less cured) region 632 is sufficiently uncured so that it allows the particles to embed into the less cured region. The first (more cured) region 631 is sufficiently cured to prevent the particles from sinking below a depth, d, from the free surface 622 of the layer 620. The concentration of the particles 699 in the less cured region 631 can be controlled by controlling the flow rate of the particles 699 from the particle deposition device 660. As illustrated in FIG. 6B, in some implementations, the particle deposition device 660 may be configured to deposit particles 699 until portions of some of the particles 699 extend above the free surface 622.

As illustrated in FIGS. 7A through 10B, in some embodiments, the more cured 731 and less cured 732 regions can be patterned laterally and/or longitudinally, allowing the depth of the particles to vary across the layer 720 laterally and/or longitudinally. Some implementations involve the use of one or more masks that mask one or both of the curing initiator and the curing inhibitor.

Figure 7A:
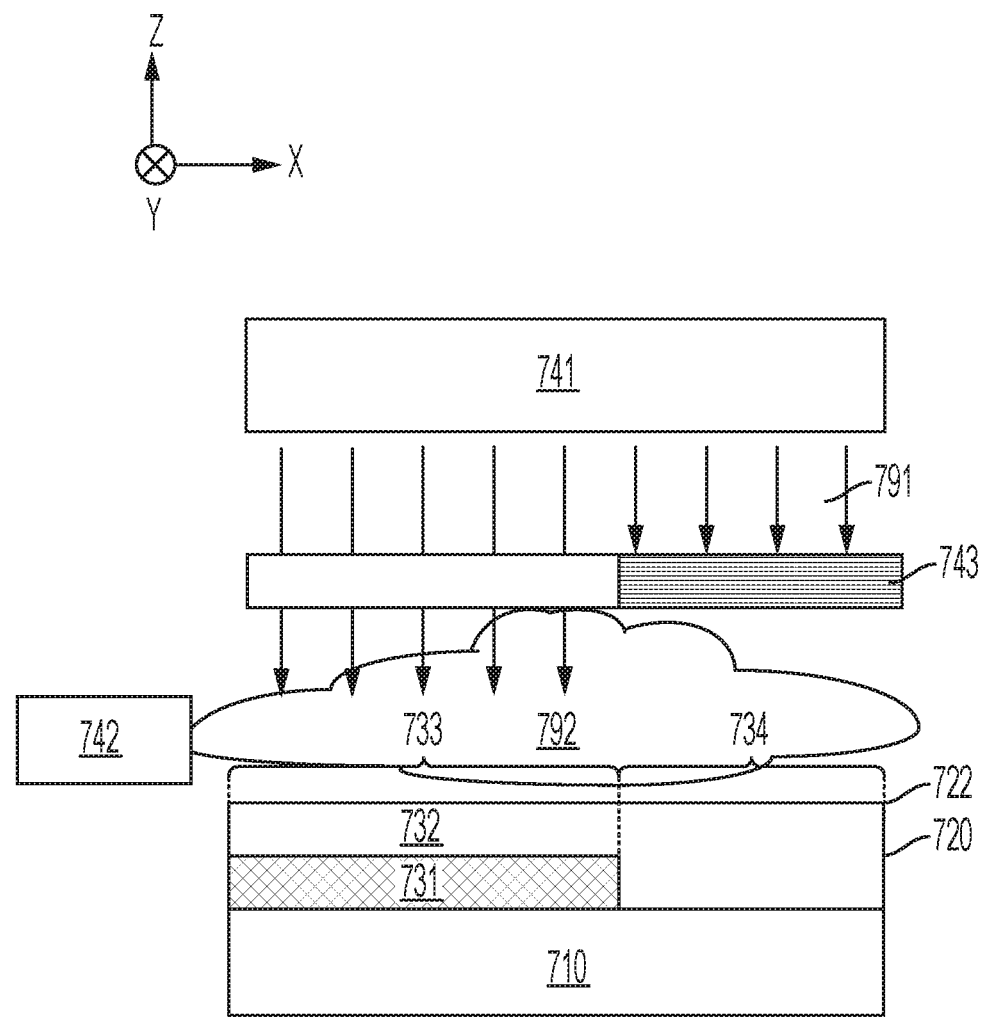

FIG. 7A is a block diagram that illustrates the use of a mask 743 to block pre-curing initiator 791. FIG. 7A depicts a pre-curing inhibitor source 742 positioned to deliver a curing inhibitor 792 to the free surface 722. The pre-curing initiator source 741 is proximate to the free surface 722 of the layer 720 and provides a curing initiator 791 that is also directed toward the free surface 722. Mask 743, which may be a photolithographic mask, a shadow mask, or any other type of mask, blocks or attenuates curing initiator 791 directed toward the free surface 722 in area 734 and substantially passes curing initiator 791 to the free surface 722 in area 733.

In area 733, the presence of the curing inhibitor 792 at the free surface 722 inhibits curing in the region 732 near the free surface 722. Deeper in the layer 720, in region 731, the effect of the curing inhibitor 792 is decreased such that the curing initiator 791 overcomes the effect of the curing inhibitor 792 to cure region 731 in area 734. The amount of the curing initiator, e.g., intensity of the UV radiation energy 791, and/or the amount of the curing inhibitor, e.g., flow rate of curing inhibitor gas 792, can be adjusted by the controller to control the relative thicknesses of the more cured region 731 and the less cured region 732 of the layer 720 in area 734. In area 734 of the layer 720, the curing initiator 791 is blocked such that area 734 remains uncured through the depth of the layer 720.

Figure 7B:
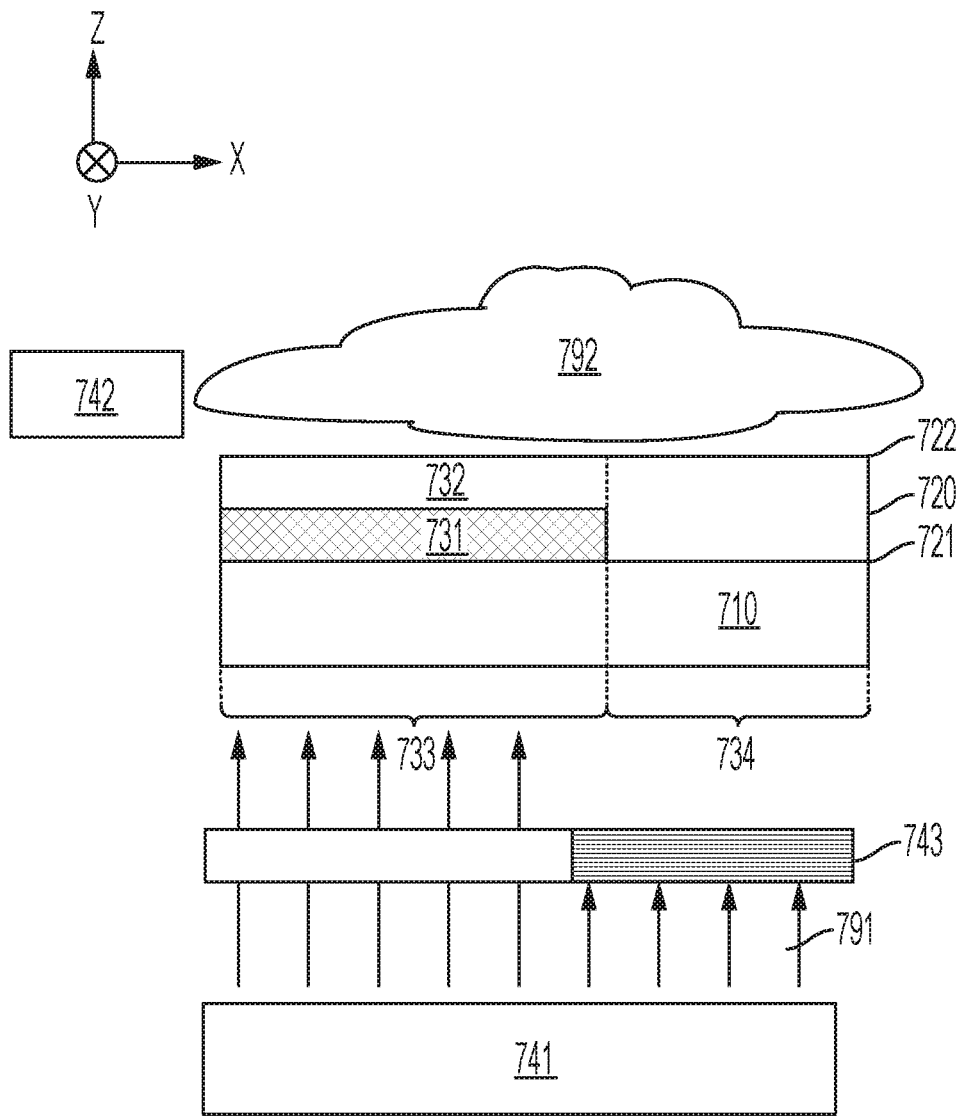

FIG. 7B illustrates a configuration in which the substrate 710 is substantially transparent to the curing initiator 791. The pre-curing initiator source 741 is located proximate the substrate 710 and mask 743 is disposed between the substrate 710 and the pre-curing initiator source 741. In area 734 of the layer 720, mask 743 blocks or attenuates curing initiator 791 from reaching the layer 720. In area 733, the mask 743 passes curing initiator 791 to the substrate 710. The substrate 710 transmits the curing initiator 791 to the interface 721 and into the layer 720.

In area 733, the presence of the curing inhibitor 792 at the free surface 722 inhibits curing in the region 732 near the free surface 722. Deeper in the layer 720, in region 731, the effect of the curing inhibitor 792 is decreased such that the curing initiator 791 overcomes the effect of the curing inhibitor 792 to cure region 731 in area 734. The amount of the curing initiator, e.g., the intensity of the UV radiation energy 791 and/or the amount of the curing inhibitor, e.g., the flow rate of curing inhibitor gas 792, can be adjusted by the controller to control the relative thicknesses of the more cured region 731 and the less cured region 732 of the layer 720 in area 733. In area 734 of the layer 720, the curing initiator 791 is blocked from reaching the layer 720, and, as a result area 734 remains uncured through the depth of the layer 720.

Figure 7C:
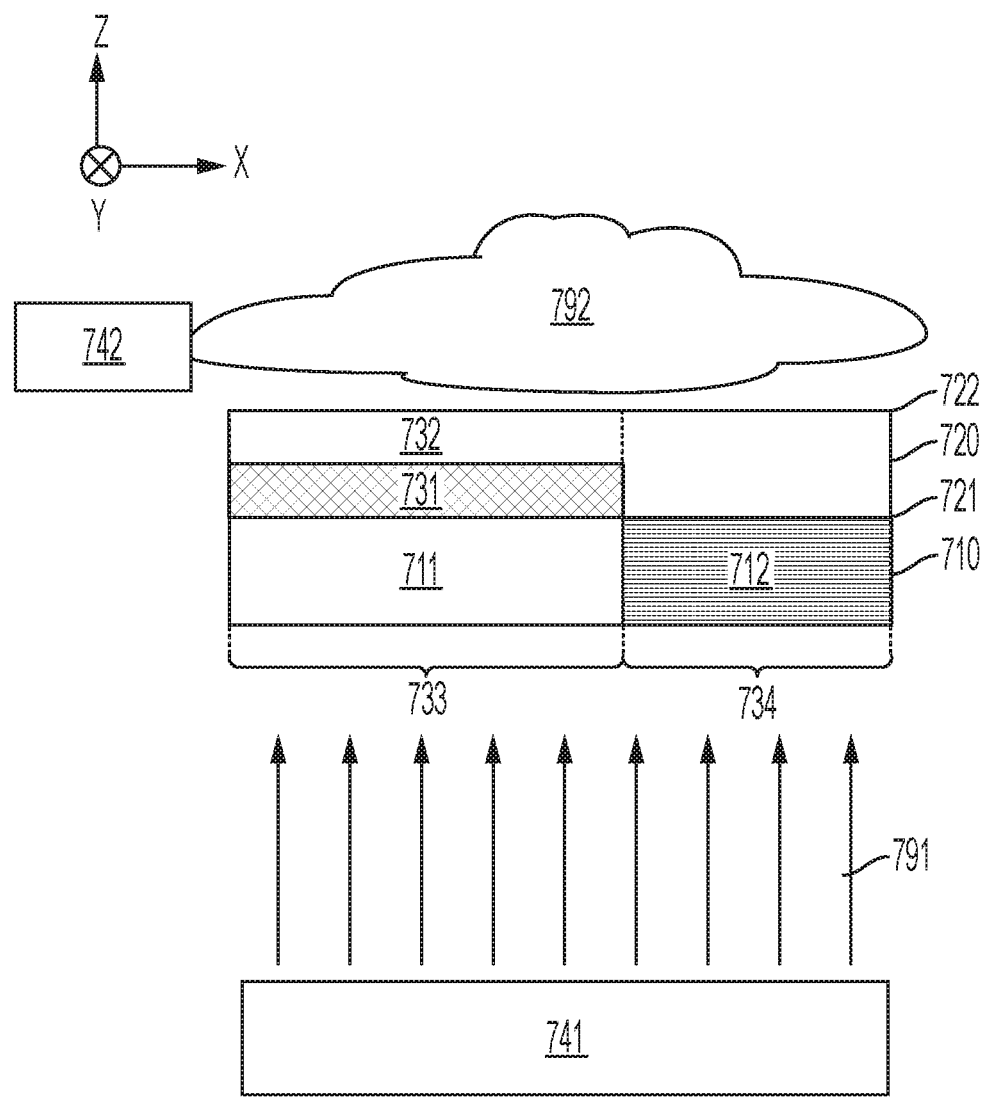

FIG. 7C illustrates a configuration in which the substrate 710 itself forms a mask. As depicted in FIG. 7C, substrate 710 includes a first section 711 at a first longitudinal position that is substantially transparent to the curing initiator 791 and a second section 712 at a second longitudinal position that blocks the curing initiator 791. The pre-curing initiator source 741 is located proximate the substrate 710. In area 734 of the layer 720, substrate section 712 blocks or attenuates curing initiator 791 from reaching the layer 720. In area 733, substrate section 711 passes curing initiator 791 to the interface 721 and into the layer 720.

In area 733, the presence of the curing inhibitor 792 at the free surface 722 inhibits curing in the region 732 near the free surface 722. Deeper in the layer 720, in region 731, the effect of the curing inhibitor 792 is decreased such that the curing initiator 791 overcomes the effect of the curing inhibitor 792 to cure region 731 in area 733. The amount of the curing initiator, e.g., the intensity of the UV radiation 791, and/or the amount of the curing inhibitor, e.g., flow rate of curing inhibitor gas 792, can be adjusted by the controller to control the relative thicknesses of the more cured region 731 and the less cured region 732 of the layer 720 in area 733. In area 734 of the layer 720, the curing initiator 791 is blocked from reaching the layer 720, and, as a result area 734 remains uncured through the depth of the layer 720.

Figure 8:
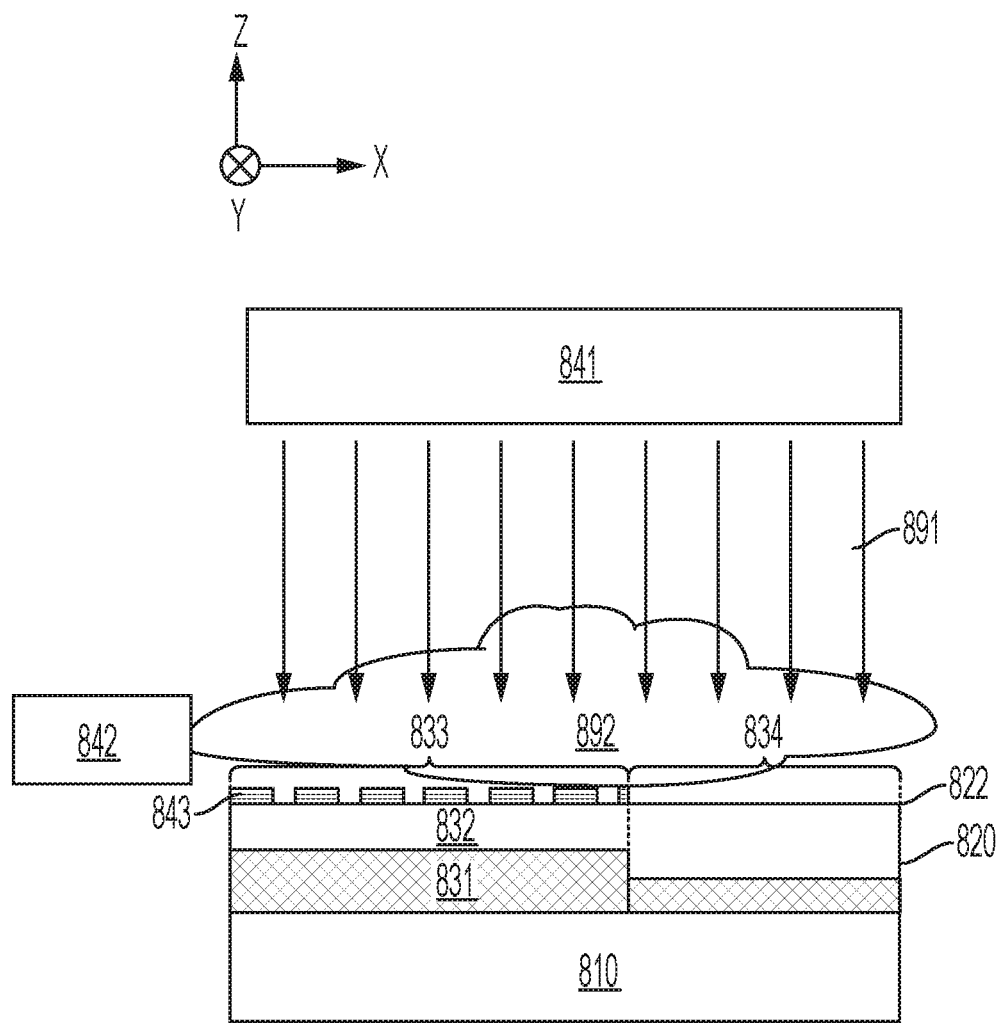

FIG. 8 depicts a pre-curing inhibitor source 842 positioned to deliver a curing inhibitor 892 to the free surface 822 of layer 820 disposed on substrate 810. The pre-curing initiator source 841 is proximate to the free surface 822 of the layer 820 and provides a curing initiator 891 that is also directed toward the free surface 822. Mask 843 blocks or attenuates curing inhibitor 892 from reaching the free surface 822 in area 833 and passes the curing inhibitor 892 to the free surface 822 in area 834 without restriction. In some embodiments, mask 843 is configured to permit the curing initiator 891 to pass through the mask 843. In some embodiments, the mask 843 at least partially blocks the curing initiator 891, but the curing initiator 891 broadens from region 834 out to permit curing of the layer 831 in region 833. For example, the curing initiator 891 may broaden out sufficiently to provide for uniform curing of the layer 831 in some implementations.

In area 833, the restricted amount of curing inhibitor 892 that reaches the free surface 822 allows more curing to occur in the region 833. The presence of unrestricted curing inhibitor 892 results in less curing in region 834. The more cured region 831 in area 833 is thicker along the depth axis when compared to the thickness of the more cured region 831 in area 834. The depth of the more cured region 831 measured from the free surface is 822 smaller in area 833 when compared to the depth of the more cured region 831 measured from the free surface 822 in area 834.

Figure 9:
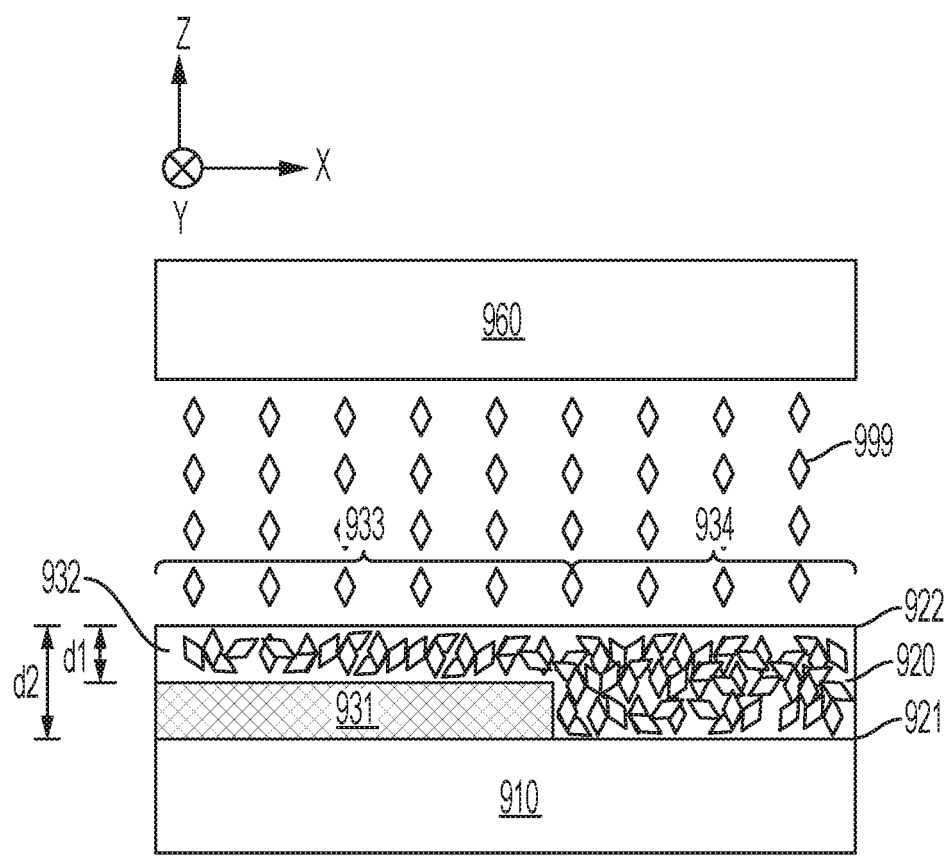

FIG. 9 illustrates the particle deposition device 960 in the process of depositing particles 999 at the free surface 922 of the layer 920 disposed on substrate 910 after the layer 920 has been pre-cured and patterned as discussed in connection with FIGS. 7A through 8. The less cured region 932 is sufficiently uncured so that it allows the particles to embed into the less material of layer 920. The pattern of the more cured region 931 prevents the particles 999 from sinking below a depth, d1, from the free surface 922 of the layer 920 in area 933 and from sinking below a depth, d2, from the free surface 922 in area 934, where d1<d2. As depicted in FIG. 9, in some embodiments, the depth d2 may extend substantially to the interface 921 between the layer 920 and the substrate 901.

Figure 10A:
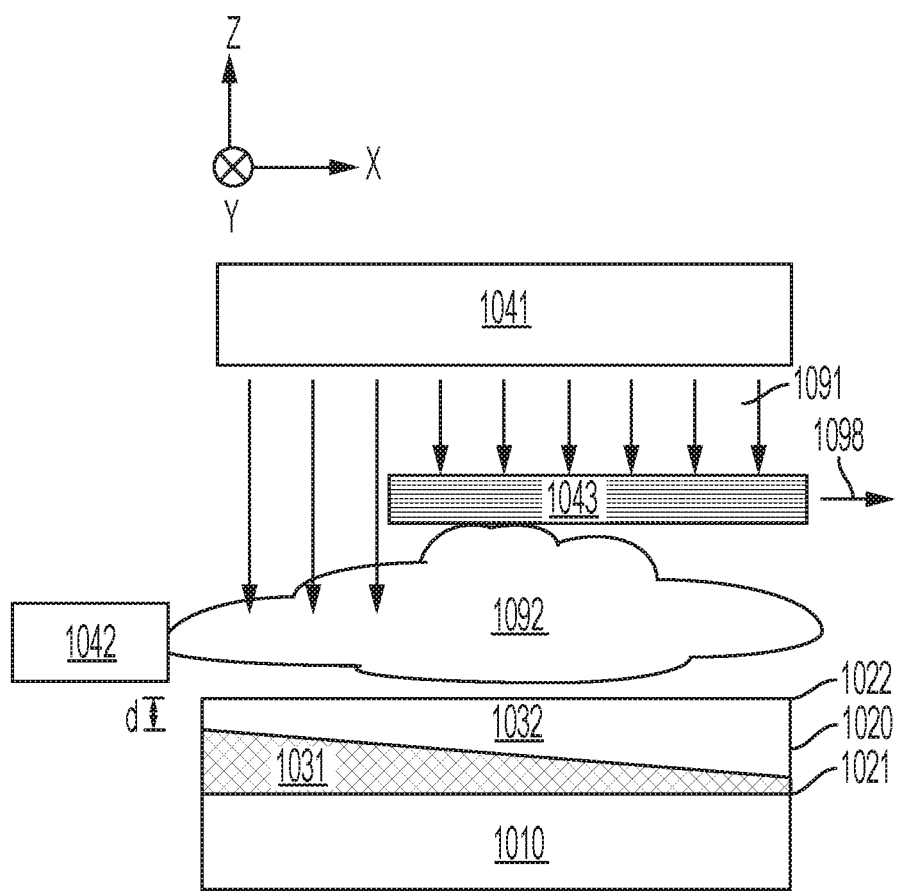
Figure 10B:
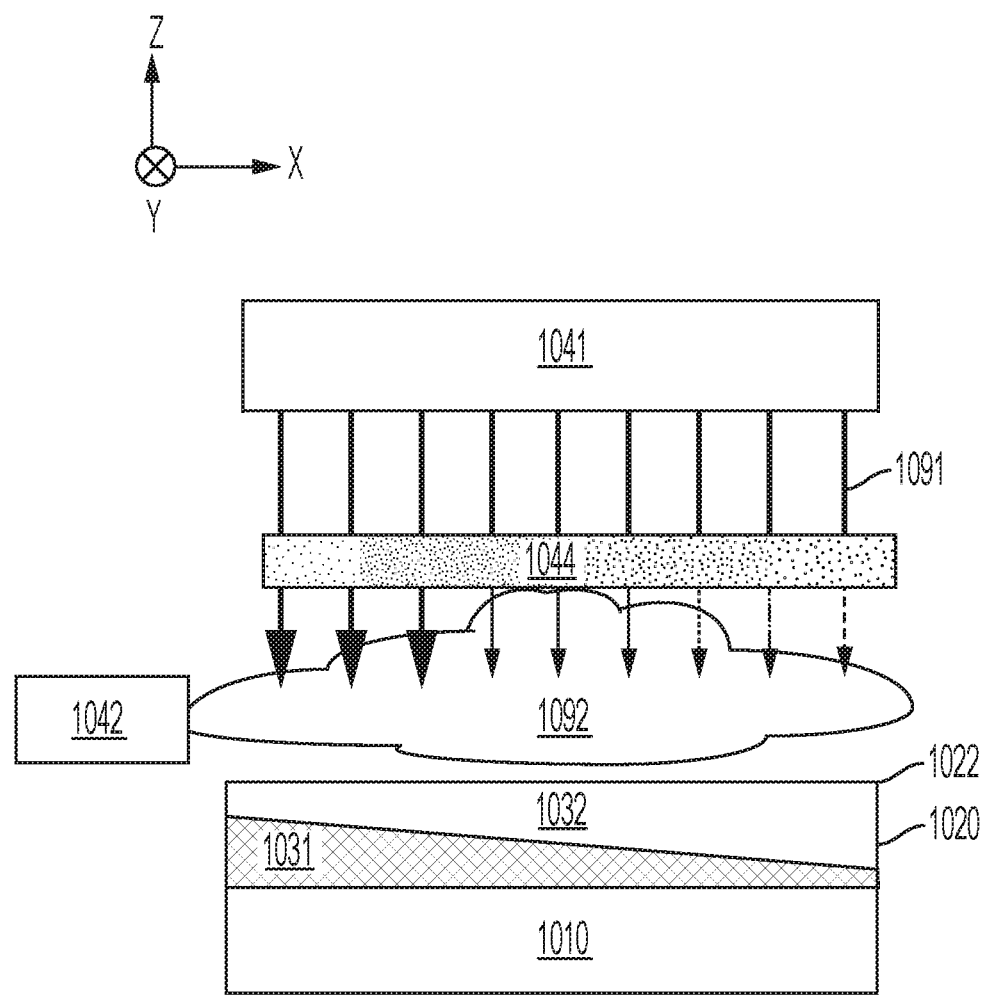
Figure 11:
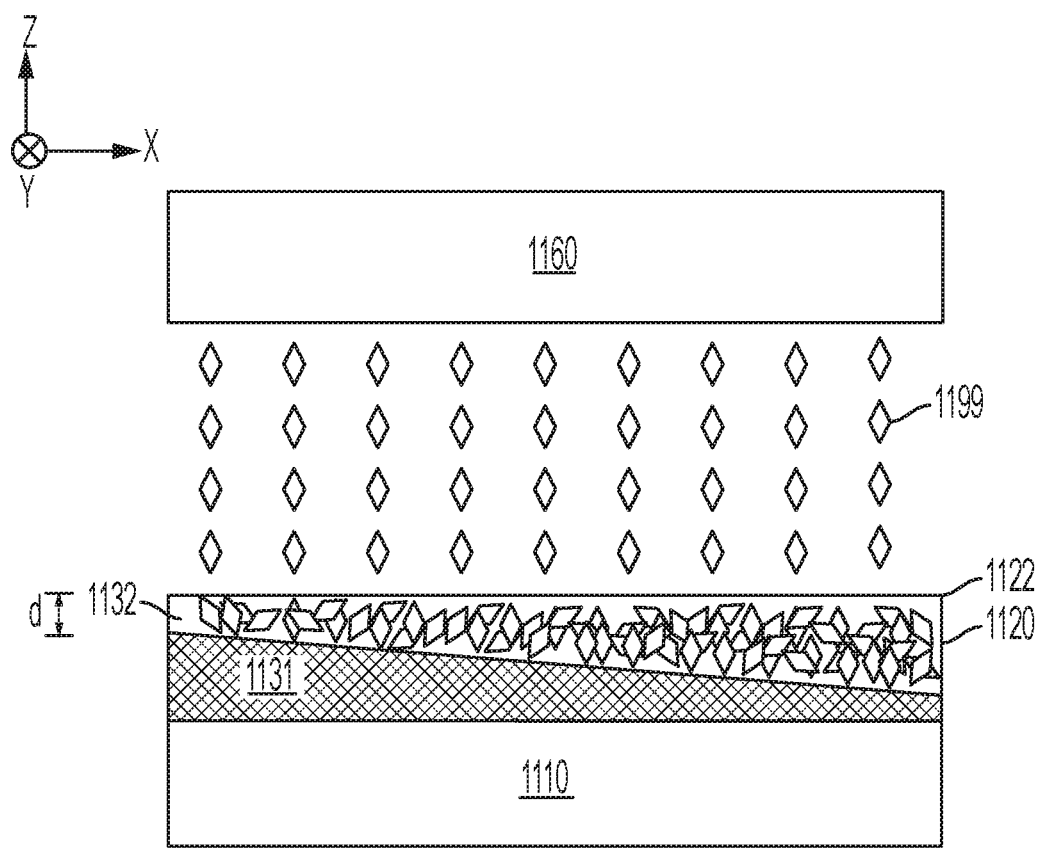

FIGS. 10A through 11 illustrate system implementations which allow for more complex lateral and/or longitudinal patterning of the more cured and less cured regions 1031, 1131, 1032, 1132 of the layer 1020, 1120. In FIG. 10A, patterning of the more cured region 1031 is accomplished using a shutter 1043 that can be moved laterally and/or longitudinally relative to the layer 1020, e.g., along the direction indicated by arrow 1098. The pre-curing inhibitor source 1042 is arranged to deliver the pre-curing inhibitor 1092 to the free surface 1022 of the layer 1020 disposed on substrate 1010. The pre-curing initiator source 1041 is located on the free surface side of the layer 1020 and directs a pre-curing initiator 1091 toward the free surface 1022.

The moveable shutter 1043 blocks or attenuates the pre-curing initiator and moves along the direction 1098. The shutter 1043 can be moved to provide a variety of patterns in the more cured and less cured regions 1031, 1032, including the gradient pattern shown. The linear gradient pattern shown can be achieved when the shutter 1043 is moved with constant velocity along the direction 1098. With constant velocity, the dwell time of the shutter 1043 is longer with respect to some areas of the free surface 1022, preventing the pre-curing initiator 1091 from reaching the free surface 1022 for a longer time period in these areas relative to other areas in which the dwell time of the shutter is shorter. The distance, d, of the more cured region 1031 from the free surface 1022 is a function of the time that the shutter 1043 blocks the pre-curing initiator 1091.

In FIG. 10B, patterning of the more cured region 1031 is accomplished using a patterned mask 1044. The mask 1044 blocks or attenuates more of the pre-curing initiator in some areas relative to other areas resulting in a variable depth of the more cured region 1031. The mask 1044 can be designed to provide a variety of patterns in the more cured and less cured regions 1031, 1032 including the gradient pattern shown. In embodiments wherein the pre-curing initiator 1091 is optical radiation, the mask can be a device 1044 capable spatially patterning the intensity of the pre-curing initiator 1091 in one or two dimensions. Suitable devices for this implementation include, for example, a liquid crystal device, a digital micromirror device (DMD), a grating light valve (GLV), an acousto-optic modulator (AOM), and/or a raster output scanner (ROS).

FIG. 11 illustrates the particle deposition device 1160 in the process of depositing particles 1199 at the free surface 1122 of the layer 1120 after the layer 1120 has been pre-cured and patterned as discussed in connection with FIGS. 10A and 10B. The less cured region 1132 is sufficiently uncured so that it allows the particles to embed into the less curable material of layer 1120. The pattern of the more and less cured regions 1131, 1132 prevents the particles 1199 from sinking below a depth, d, from the free surface 1122 of the layer 1120 where d varies linearly with x in this embodiment. The concentration of the particles 1199 in the less cured region 1132 can be controlled by controlling the deposition rate of the particles. For example, in some embodiments, the concentration of the particles 1199 may be substantially constant even though d varies linearly with position.

Figure 12:
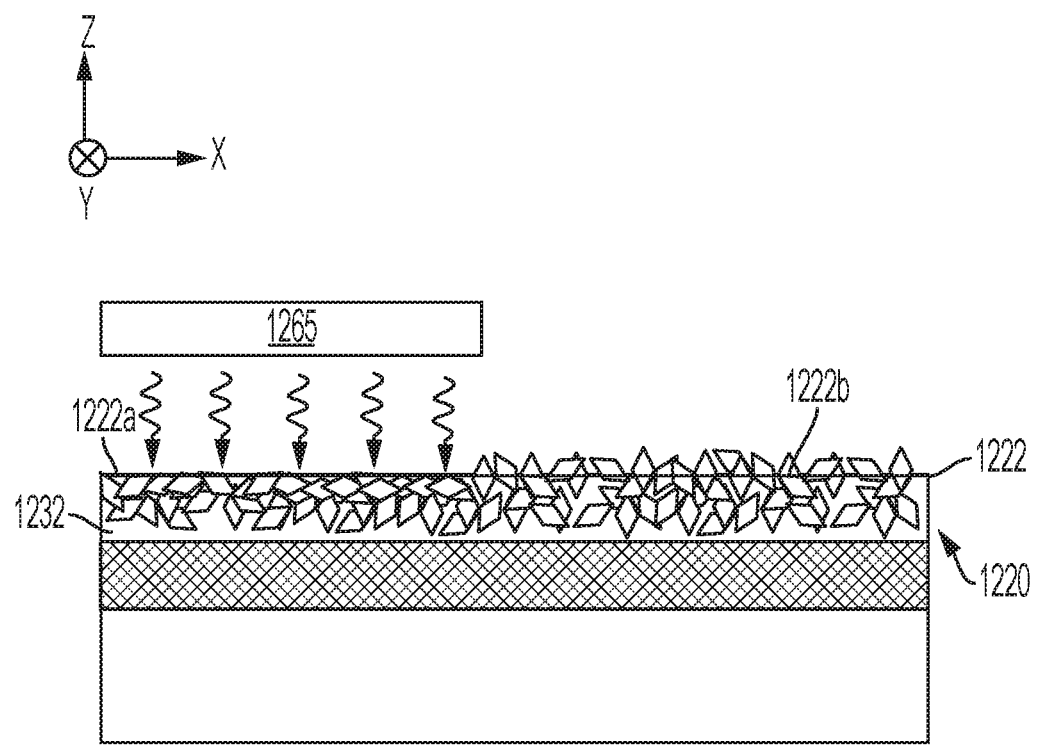
FIG. 12 is a diagram illustrating a heater used as a post-particle delivery processing device in accordance with some embodiments.

In some embodiments, it may be desirable to alter the surface of the layer, e.g., by aligning the particles at the surface and/or by depressing the particles into the curable material and/or other by other alterations. As shown in FIG. 1, the system 100 may include a post particle delivery processing device 165 to process the layer after the particles are deposited and before the layer is completely cured. In some embodiments, depicted in FIG. 12, post particle delivery processing can involve decreasing the viscosity of the less cured region 1232 so that the particles 1299 settle further into the less cured region 1232. During the settling, elongated particles 1299 may reorient or align such that their major axes lie generally in the plane of the layer 1220. Reorientation of the particles causes them to sink into the layer reducing surface roughness. In some embodiments, decreasing the viscosity may be implemented using a heater 1265 that directs heat toward the free surface 1222 of the layer 1220 as illustrated in FIG. 12. As shown in FIG. 12, the surface treatment using the heater 1265 can be patterned such that some areas 1222a of the free surface 1222 are heat treated and other areas 1222b are not.

Figure 13:
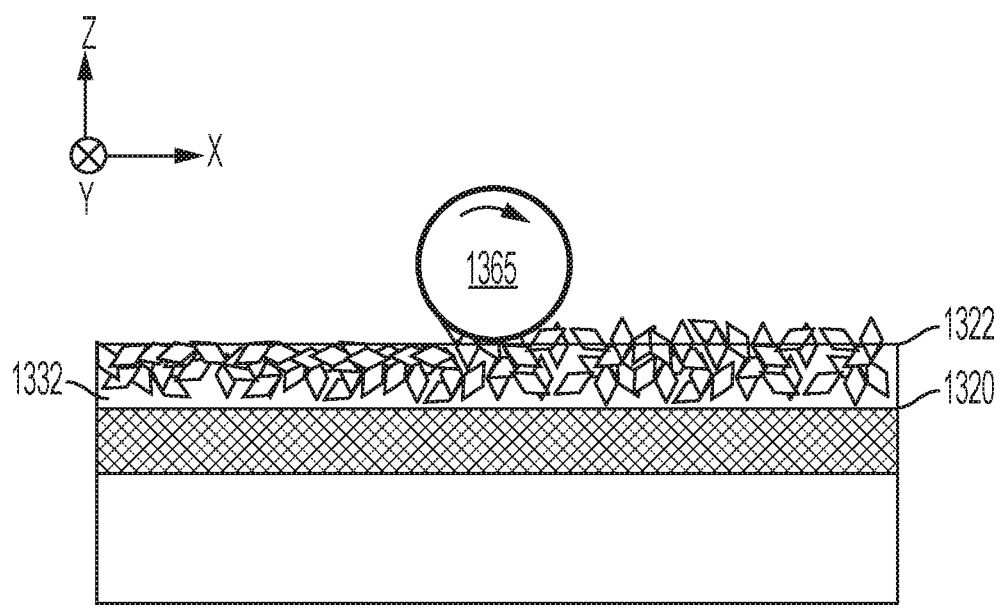
FIG. 13 is a diagram illustrating a heated roller used as a post-particle delivery processing device in accordance with some embodiments.

Post particle delivery processing can involve applying both heat and pressure to the free surface. FIG. 13 shows a heated roller 1365 that applies both heat and pressure to the free surface 1322 after the particles 1399 have been deposited. The heat and pressure from the roller 1365 depresses the particles 1399 into the less cured region 1332 and may result in alignment of elongated particles 1399. Depressing and aligning the particle in the layer can reduce surface roughness. In some implementations he heated roller 1365 can be applied across substantially the entire free surface 1322. Alternatively, the heated roller 1365 can be applied only to selected areas of the free surface 1322 so that only some areas of the free surface 1322 are heat and pressure treated.

Figure 14:
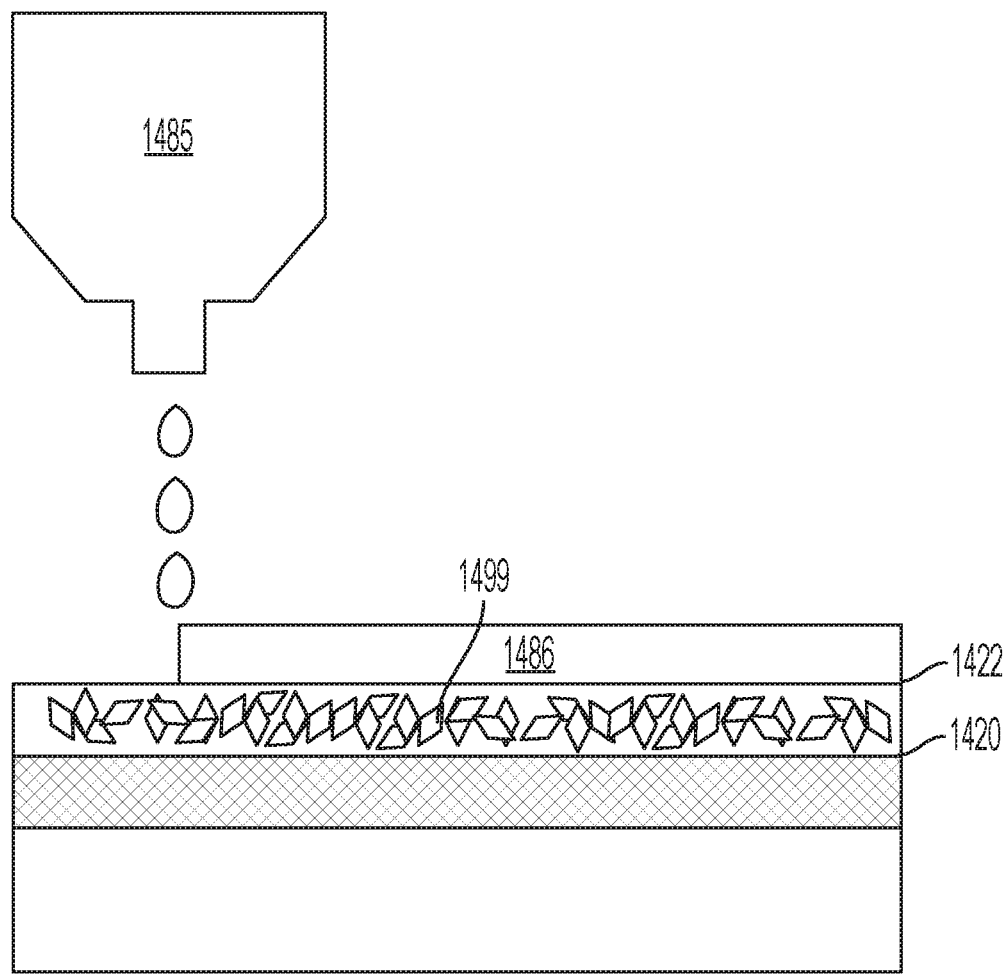
FIG. 14 illustrates a post-cure processing device in accordance with some embodiments.

Post-cure processing may be applied to the free surface after the curing step that follows particle delivery. Post cure processing may include surface treatments of the cured free surface and/or deposition of additional layers, for example. FIG. 14 illustrates post-cure processing by a deposition device 1485 that is depositing an additional layer 1486 on the free surface 1422 of the layer 1420 after the particles 1499 have been deposited and the layer 1420 has been cured.

Approaches discussed herein involve an inkjet/powder jet printing process which enables separate control of lateral resolution and particle loading by ink jetting patterns of UV ink followed by powder application and finally a curing process. The disclosed approaches provide the ability to control the depth, thickness, and concentration of particulates in the layer. According to various embodiments pre-curing of the UV curable ink in the presence of a controlled $O_2$ concentration and UV light intensity enables precise control of the particulates within the UV curable ink. This control enables the chemical, optical, and mechanical properties of the printed patterns to be controlled. The systems and methods discussed herein help to insure high quality mechanical properties of films. The disclosed approaches preserve the utility of powder inkjet over other methods including large particle densities and compatibility with a wide range of particles with high resolution.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments of the controller described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A printing system comprising:
    a liquid ejector configured to deposit a curable layer on a surface of a substrate, the layer having a free surface and an interface between the layer and the substrate;
    a pre-curing device configured to pre-cure the layer such that a first region closer to the free surface is less cured than a second region closer to the interface, the pre-curing device comprising:
        a pre-curing initiator source configured to provide a pre-curing initiator that polymerizes the layer; and
        a pre-curing inhibitor source configured to deliver an inhibitor that inhibits polymerization of the layer;
    a particle delivery device configured to deliver particles to the layer after the layer is pre-cured.

2. The system of claim 1, wherein:
    the pre-curing initiator source comprises an ultraviolet (UV) radiation source configured to generate UV radiation; and
    further comprising a controller configured to control an intensity of the UV radiation.

3. The system of claim 1, wherein:
    the pre-curing inhibitor source comprises an oxygen source configured to deliver oxygen; and
    further comprising a controller configured to control a concentration of oxygen.

4. The system of claim 1, further comprising a curing device configured to substantially cure the first region of the layer after the particles have been delivered to the free surface of the layer.

5. The system of claim 1, further comprising one or both of a heat source and a heated roller configured to heat the free surface of the layer after the particles have been delivered.

6. The system of claim 1, wherein the pre-curing device is configured to provide a spatial pattern of the pre-curing initiator that extends along one or both of a lateral axis and a longitudinal axis of the layer, wherein the spatial pattern of the pre-curing initiator provides one or more first areas with a first amount of the pre-curing initiator and provides one or more second areas with a different second amount of the pre-curing initiator.

7. The system of claim 6, wherein:
    the pre-curing initiator source comprises an array of UV radiation sources and the pre-curing initiator comprises UV radiation; and
    further comprising a controller configured to independently modulate an intensity of each of the UV radiation sources to provide the spatial pattern of the UV radiation.

8. The system of claim 6, wherein the pre-curing device comprises:
    at least one UV radiation source configured to provide the pre-curing initiator comprising UV radiation; and
    a spatial patterning device optically coupled to the at least one UV radiation source, the at least one UV radiation source and the spatial patterning device configured to provide a spatial pattern of UV radiation.

9. The system of claim 1, further comprising a pre-curing initiator patterning device configured to produce a gradient of the pre-curing initiator with respect to one or both of a lateral axis and a longitudinal axis of the free surface.

10. The system of claim 9, wherein the spatial patterning device is a moveable shutter.

11. The system of claim 1, further comprising a pre-curing inhibitor patterning device configured to provide a spatial pattern of a pre-curing inhibitor provided by the pre-curing inhibitor patterning device.

12. A method, comprising:
depositing a curable layer on a surface of a substrate, the layer having a free surface and an interface between the layer and the substrate;
pre-curing the layer such that a first region closer to the interface of the layer is more cured than a second region closer to the free surface of the layer and that the first region is located a predetermined distance from the free surface; and
delivering particles to the free surface of the layer after pre-curing the layer such that a depth of the particles is limited by the predetermined distance from the free surface.

13. The method of claim 12, further comprising curing the layer after the particles have been delivered to the free surface.

14. The method of claim 12, wherein pre-curing the layer comprises directing a pre-curing gas toward the free surface in the presence of a pre-curing inhibitor.

15. The method of claim 14, further comprising controlling pre-curing of the layer comprising controlling one or more of an intensity of the UV radiation, a concentration of the oxygen, and a temperature of the layer such that the first region is located a predetermined distance from the free surface.

16. The method of claim 12, wherein pre-curing the layer comprises directing UV radiation toward the free surface in the presence of oxygen.

17. The method of claim 12, wherein pre-curing the layer comprises at least one of:
generating a spatial pattern of a pre-curing initiator, the spatial pattern configured to pattern the second region along at least one of a lateral axis and a longitudinal axis of the layer; and
generating a gradient of the pre-curing initiator with respect to one or both of a lateral axis and a longitudinal axis of the free surface.

18. The method of claim 17, further comprising at least one of:
controlling a thickness of a band of the particles in the layer;
reorienting the particles after delivering the particles to the free surface of the layer; and
modifying a surface roughness of the free surface after delivering the particles to the free surface of the layer.

19. The method of claim 12, wherein pre-curing the layer and delivering the particles to the free surface comprise controlling the depth of the particles in the layer.

20. The method of claim 12, wherein:
delivering the particles to the free surface of the layer after pre-curing the layer comprises a delivering a second type of particles; and
further comprising delivering a first type of particles to the free surface of the layer before pre-curing the layer.

* * * * *